United States Patent [19]
Inuiya

[11] Patent Number: 5,982,984
[45] Date of Patent: Nov. 9, 1999

[54] DIGITAL IMAGE DATA RECORDING AND REPRODUCING APPARATUS AND METHOD FOR PROCESSING A HIGH QUALITY IMAGE STORED IN MULTIPLE FRAMES ON A RECORDING MEDIUM

[75] Inventor: Masafumi Inuiya, Asaka, Japan

[73] Assignee: Fuji Photo Film Co., Ltd., Kanagawa, Japan

[21] Appl. No.: 08/594,598

[22] Filed: Jan. 31, 1996

[30] Foreign Application Priority Data

| Jan. 31, 1995 | [JP] | Japan | 7-032907 |
| Feb. 17, 1995 | [JP] | Japan | 7-052117 |
| Dec. 27, 1995 | [JP] | Japan | 7-351249 |

[51] Int. Cl.[6] .......... H04N 5/225; H04N 5/76; H04N 5/91; H04N 9/79
[52] U.S. Cl. .......... 386/121; 386/8; 386/117; 348/220; 358/909.1
[58] Field of Search .......... 386/8, 36, 37, 386/40, 45, 120, 121, 124, 125, 126, 117, 122; 360/32, 48; 358/909.1, 906; 348/220, 230

[56] References Cited

U.S. PATENT DOCUMENTS

| 4,730,222 | 3/1988 | Schauffele | 386/37 |
| 4,910,605 | 3/1990 | Sasaki et al. | 386/36 |
| 4,963,991 | 10/1990 | Honjo | 386/37 |
| 4,982,291 | 1/1991 | Kurahashi et al. | 358/335 |
| 5,047,865 | 9/1991 | Inoue | 386/36 |
| 5,138,459 | 8/1992 | Roberts et al. | 358/209 |
| 5,159,460 | 10/1992 | Senso | 386/37 |
| 5,159,461 | 10/1992 | Fujimoto | 386/38 |
| 5,270,831 | 12/1993 | Parulski et al. | 358/403 |
| 5,307,171 | 4/1994 | Azuma et al. | 386/123 |
| 5,394,275 | 2/1995 | Iketani et al. | 386/35 |
| 5,412,514 | 5/1995 | Kobayashi et al. | 360/35.1 |
| 5,414,465 | 5/1995 | Kodama et al. | 348/236 |
| 5,436,665 | 7/1995 | Ueno et al. | 348/412 |
| 5,495,343 | 2/1996 | Ogura | 386/123 |
| 5,510,840 | 4/1996 | Yonemitsu et al. | 348/402 |
| 5,513,010 | 4/1996 | Kori et al. | 358/341 |
| 5,543,925 | 8/1996 | Timmermans | 358/310 |

FOREIGN PATENT DOCUMENTS 0 469 861  2/1992  European Pat. Off. .

OTHER PUBLICATIONS

Nikkei electronics Book "Data Compression and Digital Modulation", pp. 137–152, Nikkei BP Sha 1993 (Japanese).

Primary Examiner—Douglas W. Olms
Assistant Examiner—David R. Vincent
Attorney, Agent, or Firm—Birch, Stewart, Kolasch & Birch, LLP

[57] ABSTRACT

In a case frame image possessing an amount of data greater than a predetermined amount is recorded on a magnetic tape using a multiplicity of tracks, on which tracks the data has been recorded is made clear. Image data composed of 1,400,000 pixels, which is four times that of the conventional number of 350,000 pixels, is obtained. Since the image data has an amount of data that is four times that in a frame image when photography is performed using the conventional 350,000-pixel CCD, the image data is recorded in a video recording area one frame at a time on ten tracks per frame, for a total of 40 tracks. Auxiliary-area recording data representing on which tracks the recorded image data has been recorded and the manner in which the recorded image has been partitioned is recorded in an auxiliary recording area. One frame of a still picture is produced after reference is made to the auxiliary-area recording data that has been recorded in the auxiliary recording area. An image can be reproduced promptly even though an image having a large amount of data is recorded on the recording tape upon being partitioned.

36 Claims, 30 Drawing Sheets

| G |   | G |   | G |   |
|---|---|---|---|---|---|
|   | R, B |   | R, B |   | R, B |
| G |   | G |   | G |   |
|   | R, B |   | R, B |   | R, B |
| G |   | G |   | G |   |
|   | R, B |   | R, B |   | R, B |

Fig.9a

| | MSB | | | | | | | LSB | |
|---|---|---|---|---|---|---|---|---|---|
| PC0 | 1 | 1 | 1 | 1 | 0 | 0 | 0 | 0 | → HEADER |
| PC1 | 0 | 0 | 1 | 1 | 0 | 1 | 0 | 1 | → MAKER CODE |
| PC2 | 0 | 0 | 0 | 0 | 1 | 0 | 1 | 0 | → TOTAL NUMBER OF OPTION PACKS |
| PC3 | 0 | 0 | 0 | 0 | 0 | 0 | 1 | 0 | → RECORDING-TYPE MODE SETTING |
| PC4 | 1 | 1 | 1 | 1 | 1 | 1 | 1 | 1 | → NO INFORMATION |

Fig.9b

| | MSB | | | | | | | LSB | |
|---|---|---|---|---|---|---|---|---|---|
| PC0 | 1 | 1 | 1 | 1 | 0 | 0 | 0 | 1 | → HEADER |
| PC1 | 0 | 0 | 0 | 0 | 0 | 0 | 1 | 0 | → PARTITIONING METHOD |
| PC2 | 0 | 0 | 0 | 0 | 0 | 1 | 0 | 0 | → NUMBER OF THIS FRAME |
| PC3 | 0 | 0 | 0 | 0 | 0 | 1 | 0 | 0 | → DATA DISPLAY METHOD OR INSERTION METHOD ON DISPLAY UNIT |
| PC4 | 1 | 1 | 1 | 1 | 1 | 1 | 1 | 1 | → NO INFORMATION |

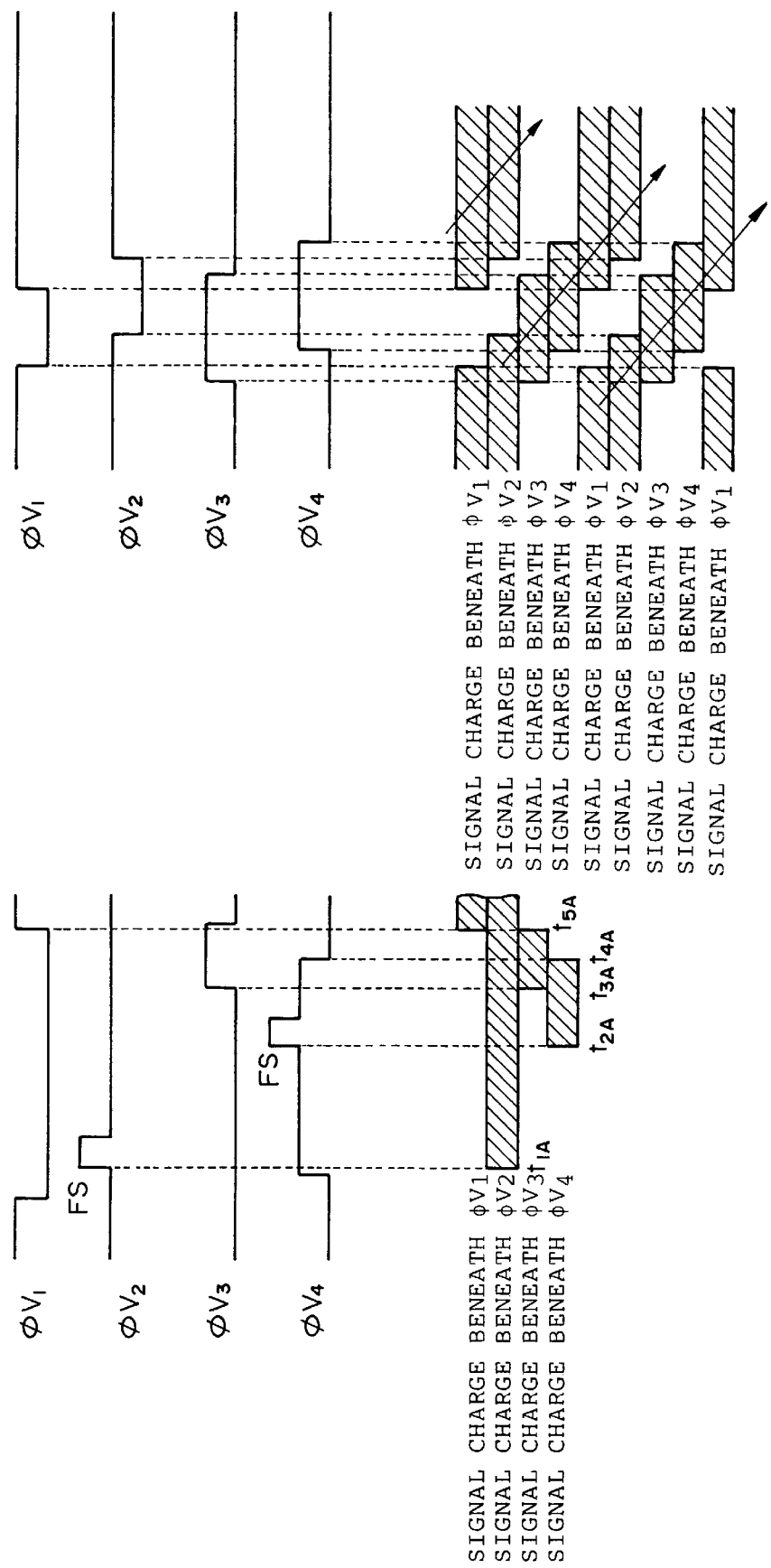

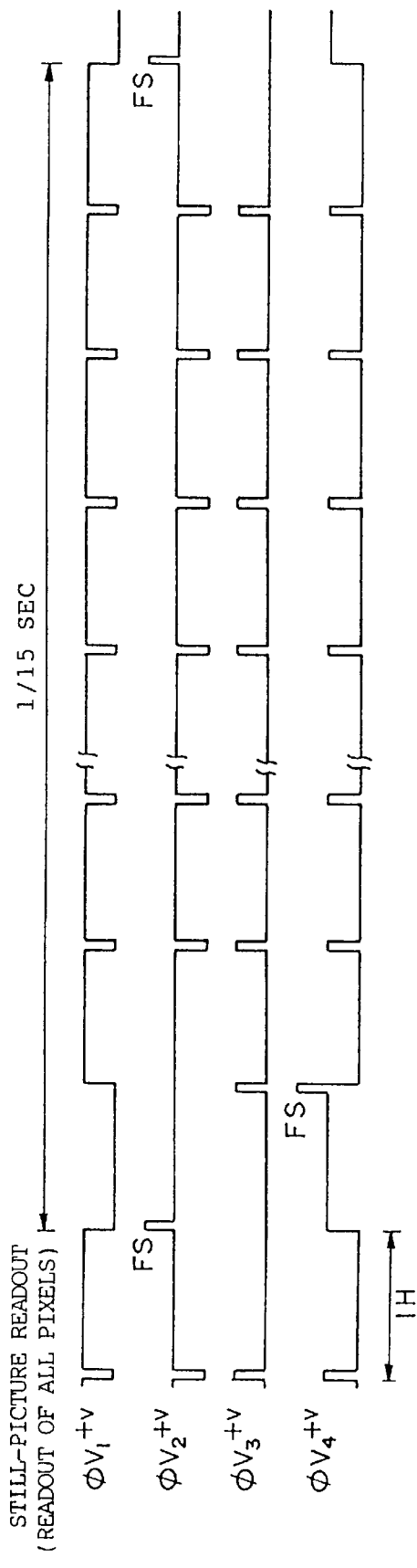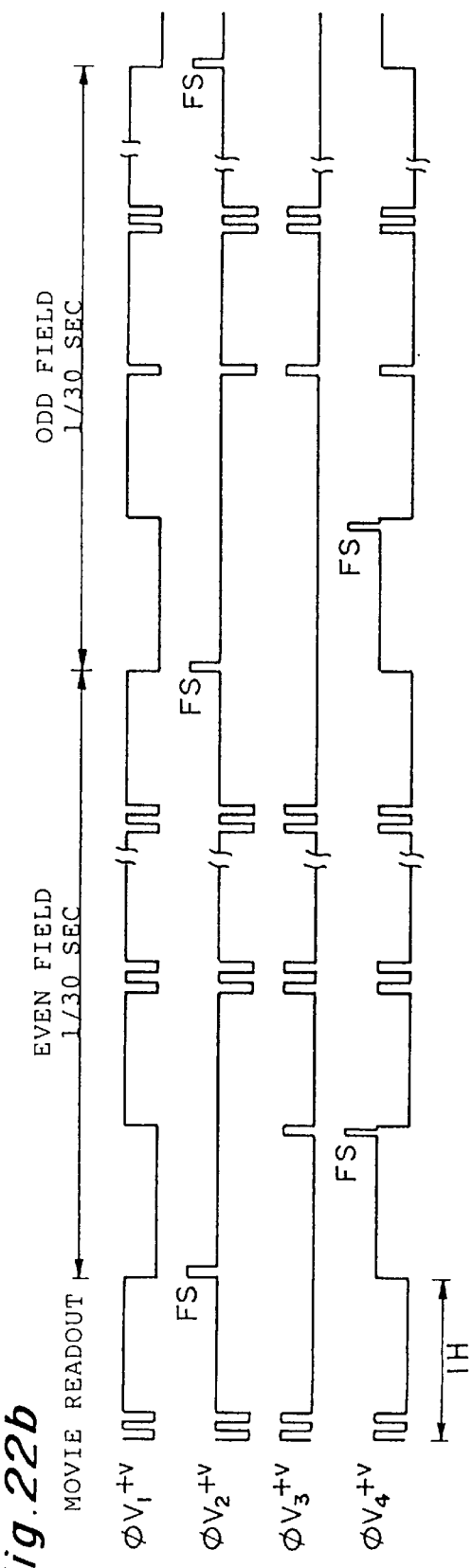

Fig. 27

| $R_{1,n}$ | $G_{1,n}$ | $B_{2,n}$ | $G_{2,n}$ | $R_{3,n}$ | $G_{3,n}$ |
|---|---|---|---|---|---|
| $B_{1,n+1}$ | $G_{1,n+1}$ | $R_{2,n+1}$ | $G_{2,n+1}$ | $B_{3,n+1}$ | $G_{3,n+1}$ |
| $R_{1,n+2}$ | $G_{1,n+2}$ | $B_{2,n+2}$ | $G_{2,n+2}$ | $R_{3,n+2}$ | $G_{3,n+2}$ |
| $B_{1,n+3}$ | $G_{1,n+3}$ | $B_{2,n+3}$ | $G_{2,n+3}$ | $B_{3,n+3}$ | $G_{3,n+3}$ |
| $R_{1,n+4}$ | $G_{1,n+4}$ | $R_{2,n+4}$ | $G_{2,n+4}$ | $B_{3,n+4}$ | $G_{3,n+4}$ |

Fig. 28a

| $R_{1,n}$ | $R_{3,n}$ | $R_{5,n}$ |
|---|---|---|
| $R_{2,n+1}$ | $R_{4,n+1}$ | $R_{6,n+1}$ |
| $R_{1,n+2}$ | $R_{3,n+2}$ | $R_{5,n+2}$ |

Fig. 28b

| $B_{2,n}$ | $B_{4,n}$ | $B_{6,n}$ |
|---|---|---|
| $B_{1,n+1}$ | $B_{3,n+1}$ | $B_{5,n+1}$ |
| $B_{2,n+2}$ | $B_{4,n+2}$ | $B_{6,n+2}$ |

Fig. 28c

| $G_{1,n}$ | $G_{2,n}$ | $G_{3,n}$ |
|---|---|---|
| $G_{1,n+1}$ | $G_{2,n+1}$ | $G_{3,n+1}$ |
| $G_{1,n+2}$ | $G_{2,n+2}$ | $G_{3,n+2}$ |

Fig. 29

LUMINANCE DATA $Y_H$

FIRST FIELD
COLUMNS →

| LOW L | $0.5R_{1,n} + 0.5G_{1,n}$ | $0.5B_{2,n} + 0.5G_{2,n}$ | $0.5R_{3,n} + 0.5G_{3,n}$ | --- |

| LOW L+1 | $0.5R_{1,n+2} + 0.5G_{1,n+2}$ | $0.5B_{2,n+2} + 0.5G_{2,n+2}$ | $0.5R_{3,n+3} + 0.5G_{3,n+2}$ | --- |

SECOND FIELD
COLUMNS →

| LOW L | $0.5B_{1,n+1} + 0.5G_{1,n+1}$ | $0.5R_{2,n+1} + 0.5G_{2,n+1}$ | $0.5B_{3,n+1} + 0.5G_{3,n+1}$ | --- |

| LOW L+1 | $0.5B_{1,n+3} + 0.5G_{1,n+3}$ | $0.5R_{2,n+3} + 0.5G_{2,n+3}$ | $0.5B_{3,n+3} + 0.5G_{3,n+3}$ | --- |

THIRD FIELD
COLUMNS →

| LOW L | $0.5G_{1,n} + 0.5B_{2,n}$ | $0.5G_{2,n} + 0.5R_{3,n}$ | $0.5G_{3,n} + 0.5B_{4,n}$ | --- |

| LOW L+1 | $0.5G_{1,n+2} + 0.5B_{2,n+2}$ | $0.5G_{2,n+2} + 0.5R_{3,n+2}$ | $0.5G_{3,n+2} + 0.5B_{4,n+2}$ | --- |

FOURTH FIELD
COLUMNS →

| LOW L | $0.5G_{1,n+1} + 0.5R_{2,n+1}$ | $0.5G_{2,n+1} + 0.5B_{1,n+1}$ | $0.5G_{3,n+1} + 0.5R_{4,n+1}$ | --- |

| LOW L+1 | $0.5G_{1,n+3} + 0.5R_{2,n+3}$ | $0.5G_{2,n+3} + 0.5B_{2,n+3}$ | $0.5G_{3,n+3} + 0.5R_{4,n+3}$ | --- |

FIRST FIELD
COLUMNS →         DATA $R_L$, $G_L$, $B_L$ OF
                  THREE PRIMARY COLORS $R_L$ LOW L  | $0.75R_{1,n} + 0.25R_{3,n}$ | $0.75R_{3,n} + 0.25R_{5,n}$ | ---

$G_L$ LOW L  | $0.25G_{0,n} + 0.5G_{1,n} + 0.25G_{2,n}$ | $0.25G_{2,n} + 0.5G_{3,n} + 0.25G_{4,n}$ | ---

$B_L$ LOW L  | $0.25B_{0,n} + 0.75B_{2,n}$ | $0.25B_{2,n} + 0.75B_{4,n}$ | ---

SECOND FIELD
COLUMNS →

$R_L$ LOW L  | $0.25R_{0,n+1} + 0.75R_{2,n+1}$ | $0.25R_{2,n+1} + 0.75R_{4,n+1}$ | ---

$G_L$ LOW L  | $0.25G_{0,n+1} + 0.5G_{1,n+3} + 0.25G_{2,n+1}$ | $0.25G_{2,n+1} + 0.5G_{3,n+1} + 0.25G_{4,n+1}$ | ---

$B_L$ LOW L  | $0.75B_{1,n+1} + 0.25B_{3,n+1}$ | $0.75R_{3,n+1} + 0.25B_{5,n+1}$ | ---

THIRD FIELD
COLUMNS →

*Fig.30*

$R_L$ LOW L  | $0.25R_{1,n+1} + 0.25R_{3,n+1}$ | ---

$G_L$ LOW L  | $0.25G_{1,n+1} + 0.5G_{2,n+1} + 0.25G_{3,n+1}$ | ---

$B_L$ LOW L  | $0.25B_{1,n+1} + 0.75B_{3,n+1}$ | ---

FOURTH FIELD
COLUMNS →

$R_L$ LOW L  | $0.75R_{2,n+1} + 0.25R_{4,n+1}$ | ---

$G_L$ LOW L  | $0.25G_{1,n+1} + 0.5G_{1,n+1} + 0.25G_{2,n+1}$ | ---

$B_L$ LOW L  | $0.25B_{1,n+1} + 0.75B_{3,n+1}$ | ---

DIGITAL IMAGE DATA RECORDING AND REPRODUCING APPARATUS AND METHOD FOR PROCESSING A HIGH QUALITY IMAGE STORED IN MULTIPLE FRAMES ON A RECORDING MEDIUM

BACKGROUND OF THE INVENTION

1. Field of the Invention

This invention relates to a digital image data recording apparatus inclusive of a digital video tape recorder (DVTR) and digital camera, etc., a method of recording digital image data in a DVTR, an apparatus and method for reproducing digital image data that has been recorded on a magnetic tape by the DVTR or recording method, as well as a solid-state electronic image sensing device and a method of reading a signal charge out of the solid-state electronic image sensing device.

2. Description of the Related Art

A digital video tape recorder (DVTR) senses the image of a subject using a solid-state electronic image sensing device such as a CCD, converts a video signal, which represents the image of the subject obtained by image sensing, to digital image data and records the digital image data on magnetic tape. A CCD used in a DVTR generally has about 350,000. pixels in an array of 720 pixels horizontally and 480 pixels vertically. A signal charge that accumulates in the solid-state electronic image sensing device used in the DVTR represents the image of the subject. The signal charge can be read out of the device by non-interlaced readout (readout of all pixels) and by interlaced readout (movie readout).

In non-interlaced readout, all of the signal charge that has accumulated in the solid-state electronic image sensing device is outputted at a period of $1/30$ of a second. Accordingly, non-interlaced readout makes its possible to obtain a high-quality image of a subject and is a method of readout that is suitable for situations in which the reproduction of still pictures is considered. In interlaced readout, output of signal charge that has accumulated in odd-numbered rows of photoelectric transducers in the solid-state electronic image sensing device and output of signal charge that has accumulated in even-numbered rows of the photoelectric transducers alternate every $1/60$ of a second. Interlaced readout makes it possible to shorten the signal-charge output period in comparison with non-interlaced readout and is a method of readout that is suitable for situations in which reproduction of moving pictures is considered.

With non-interlaced readout, one frame is composed of two fields and frame recording for recording a frame image is performed. According to interlaced readout, field recording which records a field image for every field is carried out. In both frame recording and field recording, one frame of image data is recorded on magnetic tape over a time of $1/30$ of a second and using a recording area composed of ten tracks.

Thus, in a digital video tape recorder, one frame of image data of the digital image data obtained by photographing a subject using a 350,000-pixel CCD generally is recorded on ten tracks over a period of $1/30$ of a second. This recording scheme is the standard in industry (For example, see NIKKEI ELECTRONICS BOOKS, "Data Compression and Digital Modulation", pp. 137–152, Nikkei BP Sha, 1993).

The image quality in the image sensing section of the digital video tape recorder depends upon the number of pixels in the CCD; the larger the number of CCD pixels, the greater the improvement in image quality. However, in order for image data obtained from a CCD to be recorded on magnetic tape using a CCD having a large number of pixels for the sake of improving image quality, the recording of the image data requires more than $1/30$ of a second and a recording area of more than ten tracks. This is not in conformity with the above-mentioned standard established for a digital video tape recorder.

In a case where the image sensing section of a DVTR uses a CCD having more pixels than the approximately 350,000 pixels employed conventionally, there is a need for inter-laced readout and non-interlaced readout suited to such a CCD.

SUMMARY OF THE INVENTION

Accordingly, an object of the present invention is to obtain still pictures having a high picture quality while maintaining compatibility with the above-mentioned existing standard of digital video tape recorders.

Further, an object of the present invention is to realize readout of signal charge, and recording and reproducing of a signal suitably in accordance with number of pixels of a solid-state electronic image sensing device.

According to the present invention, the foregoing object is attained by providing a digital image data recording apparatus in which one frame of an image is represented by unit image data having a predetermined amount of image data, and size of a recording area for the unit image data and recording time necessary for recording the unit image data are each predetermined, the recording apparatus recording the unit image data on a recording medium successively at a period equivalent to the recording time, the apparatus comprising input means for entering image data possessing an amount of data that is n times the amount of data in the unit image data, image data partitioning means for partitioning the image data, which has been obtained from the input means, into n units of unit image data in such a manner that each represents one frame of an image, and recording means for recording the n units of unit image data partitioned by the image data partitioning means on the recording medium over n recording areas at a recording time increased by a factor of n.

The present invention also provides a method of recording digital image data. Specifically, in a digital image data recording apparatus in which one frame of an image is represented by unit image data having a predetermined amount of image data, and size of a recording area for the unit image data and recording time necessary for recording the unit image data are each predetermined, the recording apparatus recording the unit image data on a recording medium successively at a period equivalent to the recording time, the recording method comprises the steps of obtaining image data possessing an amount of data that is n times the amount of data in the unit image data, partitioning the obtained image data into n units of unit image data in such a manner that each represents one frame of an image, and recording the n units of unit image data obtained by partitioning on the recording medium over n recording areas at a recording time increased by a factor of n.

In a preferred embodiment, a movie recording mode and a still-picture recording mode are provided, and the above-described recording method is executed when the still-picture recording mode has been set. As will be described later, reproduction of a moving picture also is possible based upon image data that has been recorded in the still-picture recording mode.

The unit image data corresponds to one frame of image data if stated in terms of the present industrial standard mentioned above.

It is permissible to enter image data outputted by an image data processing apparatus other than a television and obtain image data having an amount of data that is n times the amount of image data in the unit image data. It is permissible to provide the digital image data recording apparatus with image sensing means and sense the image of the subject using the image sensing means, thereby obtaining image data representing the image of the subject and having an amount of data that is n times the amount of image data in the unit image data.

It is permissible to sense the image of a subject using a single solid-state electronic image sensing device which generates an amount of data that is n times the amount of image data in the unit image data with regard to one frame of an image, and obtain image data representing the image of the subject. It is also permissible to sense the image of a subject using three solid-state electronic image sensing devices and obtain image data representing the image of the subject and having an amount of data that is n times the amount of image data in the unit image data.

In any case, image data representing the image of the subject and having an amount of data that is n times the amount of image data in the unit image data is obtained. As a result, an image having a high image quality is captured at the image sensing stage.

In order to record image data, which is capable of producing the high-quality image thus obtained, while maintaining compatibility with a recording scheme in accordance with existing standards and without losing any image data, the present invention is so adapted that the image data representing the image of the subject is partitioned into n units of unit image data. The n units of unit image data obtained by partitioning is recorded on the recording medium in accordance with the recording scheme of the existing standards.

Thus, the image quality of the high-quality image data obtained by image sensing is maintained as is and recording is performed in a form that conforms to the existing standards. Accordingly, it is possible to reproduce a high-quality still picture, as will be described later.

The partitioning of the image data into n portions is carried out in such a manner that the image represented by the partitioned image data also is capable of expressing one frame of an image. Since one frame of an image is represented even by one unit of unit image data obtained by partitioning, the method of the invention is suited to moving-picture reproduction performed for every unit of unit image data.

An apparatus and method for reproducing digital image data according to the present invention reproduce image data from a recording medium that has been recorded on in the manner described above. The reproducing apparatus and method can be applied to the above-mentioned digital video tape recorder or can be implemented as an independent digital image data reproducing apparatus.

If the digital image data reproducing apparatus is defined from the standpoint of reproduction of a still picture, the apparatus includes reading means for reading image data from the recording medium, and still-picture generating means for generating image data, which represents one frame of a still picture, by combining n units of unit image data read by the reading means and generated by partitioning from one frame of image data.

The method of reproducing digital image data includes the steps of reading image data from the recording medium, and generating image data, which represents one frame of a still picture, by combining n units of read unit image data generated by partitioning from one frame of image data.

If the digital image data reproducing apparatus is defined from the standpoint of reproduction of a still picture and a moving picture, the apparatus includes reading means for reading image data from the recording medium, playback mode setting means for selectively setting a still-picture playback mode and a movie playback mode, still-picture generating means which, when the still-picture playback mode has been set, is for generating image data, which represents one frame of a still picture, by combining n units of unit image data read by the reading means and generated by partitioning from one frame of image data, and moving-picture generating means which, when the movie playback mode has been set, is for converting unit image data, which has been read by the reading means, to a signal suitable for display and outputting the signal successively at a period equivalent to the recording time.

A method of reproducing digital image data includes the steps of reading image data from the recording medium, making it possible to selectively set a still-picture playback mode and a movie playback mode, generating, when the still-picture playback mode has been set, image data representing one frame of a still picture by combining n units of read unit image data generated by partitioning from one frame of image data, and, when the movie playback mode has been set, converting the read unit image data to a signal suitable for display and outputting the signal successively at a period equivalent to the recording time.

Image data is read out of the recording medium. The n units of unit image data generated by partitioning of one frame of image data and recorded in the recording operation are combined so as to represent one frame of the original still picture. The combined still picture data is displayed upon being applied to a display unit or the still picture is printed out upon being applied to a printer.

Since image data composed of a large number of pixels is restored as is, a high-quality still picture is obtained.

Reproduction of a moving picture is possible based upon the image data read out of the recording medium. Reproduction of the moving picture obtained by an ordinary digital video tape recorder can be dealt with in the same manner.

In the reproduction of a still picture, it is preferred that the image data be interpolated in the vertical direction of the image data that has been read out of the recording medium and that a still picture is generated by the image data that has been interpolated in the vertical direction.

As a result, resolution in the vertical direction is essentially improved so that a still picture of higher quality is obtained.

A solid-state electronic image sensing device according to the present invention comprises photoelectric transducers arrayed in a plurality of columns in the horizontal direction and a plurality of rows in the vertical direction, vertical transfer lines extending in the vertical direction adjacent the columns of photoelectric transducers for transferring, in the vertical direction, signal charge that has accumulated in the photoelectric transducers, a horizontal transfer line for transferring, in the horizontal direction, signal charge that has been transferred by the vertical transfer lines, a drain for sweeping out signal charge that has been transferred by the vertical transfer lines, first drive control means for driving the vertical transfer lines in such a manner that signal charge that has accumulated in all of the photoelectric transducers is transferred to the horizontal transfer line when all pixels are read out for reproducing a high-quality image, and second drive control means which, at time of movie readout for movie reproduction, is for driving the vertical transfer lines in such a manner that readout of signal charge is divided into readout of signal charge for a first field and readout of signal charge for a second field, wherein in readout of signal charge for the first field, signal charge that has accumulated in the photoelectric transducers representing pixels in one of horizontally extending odd rows and even rows is transferred to the horizontal transfer line and signal charge that has accumulated in the photoelectric transducers representing pixels in the other of the odd rows and even rows is transferred to the drain, and in readout of signal charge for the second field, signal charge that has accumulated in the photoelectric transducers of the other of the odd rows and even rows is transferred to the horizontal transfer line and signal charge that has accumulated in the photoelectric transducers of said one of the odd rows and even rows is transferred to the drain.

The present invention also provides a method of reading signal charge out of the solid-state electronic image sensing device. Specifically, in a solid-state electronic image sensing device having photoelectric transducers arrayed in a plurality of columns in the horizontal direction and a plurality of rows in the vertical direction, vertical transfer lines extending in the vertical direction adjacent the columns of photoelectric transducers for transferring, in the vertical direction, signal charge that has accumulated in the photoelectric transducers, and a horizontal transfer line for transferring, in the horizontal direction, signal charge that has been transferred by the vertical transfer lines, a method of reading out signal charge comprises a step of providing a drain for sweeping out signal charge that has been transferred by the vertical transfer lines, a step of transferring signal charge that has accumulated in all of the photoelectric transducers to the horizontal transfer line when all pixels are read out for reproducing a high-quality image, a step of performing readout of signal charge in which readout is divided into readout of signal charge for a first field and readout of signal charge for a second field at time of movie readout for movie reproduction, a step, in readout of signal charge for the first field, of transferring signal charge that has accumulated in the photoelectric transducers representing pixels in one of horizontally extending odd rows and even rows to the horizontal transfer line and sweeping out, from the drain, signal charge that has accumulated in the photoelectric transducers representing pixels in the other of the odd rows and even rows, and a step, in readout of signal charge for the second field, of transferring signal charge that has in the photoelectric transducers of said other of the odd rows and even rows to the horizontal transfer line and sweeping out, from the drain, signal charge that has accumulated in the photoelectric transducers of said one of the odd rows and even rows.

In accordance with the present invention, the solid-state electronic image sensing device is provided with the drain for sweeping out the signal charge.

When movie readout is performed, the signal charge that has accumulated in the photoelectric transducers is read out upon being divided into a signal charge for the first field and a signal charge for the second field. When the signal charge for the first field is read out, the signal charge that has accumulated in the photoelectric transducers of the rows of one of the odd rows and even rows becomes the output of the solid-state electronic image sensing device. The signal charge that has accumulated in the photoelectric transducers of the rows of the other of the odd rows and even rows is swept out from the drain. When the signal charge for the second field is read out, the signal charge that has accumulated in the photoelectric transducers that accumulated the signal charge swept out from the drain in the readout of the signal charge for the first field becomes the output of the solid-state electronic image sensing device. When the signal charge for the second field is read out, the signal charge that has accumulated in the photoelectric transducers that accumulated the signal charge outputted in the readout of the signal charge for the first field is swept out of the drain. With the readout of the signal charge for the first field and the readout of the signal charge for the second field, the readout of the signal charge that has accumulated in the photoelectric transducers of the odd rows alternates with the readout of the signal charge that has accumulated in the photoelectric transducers of the even rows. Accordingly, interlaced readout is achieved.

When readout of all pixels is performed, the signal charge that has accumulated in the photoelectric transducers is transferred to the horizontal transfer line to become the output of the solid-state electronic image sensing device. As a result, non-interlaced readout is achieved.

By providing such a solid-state electronic image sensing device in the image sensing section of a DVTR, the signal charge outputted by the solid-state electronic image sensing device by interlaced readout or non-interlaced readout is recorded on magnetic tape as image data representing the image of a subject. By reproducing image data obtained based upon non-interlaced readout, still pictures having a high picture quality, for example, are obtained. By reproducing image data obtained based upon interlaced readout, moving pictures exhibiting smooth motion, for example, are obtained.

The present invention is applicable even if the number of pixels represented by the photoelectric transducers in the photoelectric transducer constructing the solid-state electronic image sensing device is n times the number of pixels of a unit image represented by unit image data possessing a predetermined amount of image data with regard to one frame of an image.

In this case also it is possible to realize readout of all pixels and movie readout, and the image data obtained in dependence upon each type of readout can be recorded on magnetic tape. A high-quality still picture is obtained by reproducing image data acquired based upon readout of all pixels, and a smooth moving picture is obtained by reproducing image data obtained by movie readout. In particular, since the photoelectric transducers accumulate signal charge the amount of which is greater by a factor of n, image data representing a sufficiently bright image of a subject is recorded on magnetic tape even though signal charge is swept out from the drain in movie readout. Accordingly, a reproduced moving picture possesses sufficient brightness even in a case where a moving picture is obtained by reproducing image data acquired based upon movie readout.

The horizontal transfer line constructing the solid-state electronic image sensing device may be constituted by a first horizontal transfer line and a second horizontal transfer line. In such case the first and second horizontal transfer lines would transfer signal charge that has accumulated in the photoelectric transducers of different columns. For example, the first horizontal transfer line would transfer signal charge that has accumulated in the photoelectric transducers of odd rows and the second horizontal transfer line would transfer signal charge that has accumulated in the photoelectric transducers of even rows.

Since signal charge is transferred utilizing the first horizontal transfer line and the second horizontal transfer line, the amount of signal charge transferred in one horizontal transfer line is decreased. Accordingly, signal charge can be transferred in the horizontal direction using comparatively slow horizontal transfer clock pulses.

In a case where the horizontal transfer line is constituted by the first horizontal transfer line and the second horizontal transfer line, color filters for the color green may be provided on the light-receiving surfaces of the photoelectric transducers in the columns of one of the odd columns of photoelectric transducers and even columns of photoelectric transducers, and color filters of the color red or blue may be provided on the light-receiving surfaces of the photoelectric transducers in the columns of the other of the odd columns of photoelectric transducers and even columns of photoelectric transducers. As a result, signal charge representing a green component is outputted from the horizontal transfer line of one of the first horizontal transfer line and second horizontal transfer line, and signal charge representing a blue component or red component is outputted from the other horizontal transfer line. Since signal charge is outputted separately from the horizontal transfer lines per each color component, subsequent processing becomes comparatively easy.

In a case where the image of a subject is sensed using the above-described solid-state electronic image sensing device, it is arranged so that the solid-state electronic image sensing device is capable of being set to readout of all pixels or to movie readout. When the set mode is the mode for readout of all pixels, signal charge that has accumulated in all of the photoelectric transducers and been outputted from the horizontal transfer line is compressed as one frame of still-picture data. When the set mode is the movie readout mode, the signal charge for the first field is compressed as image data of a first field image, signal charge for the second field is compressed as image data of a second field, and the compressed image data can be recorded on the recording medium.

In a case where recording is thus performed, image data is read from the recording medium and it is so arranged that a still-picture playback mode and a movie playback mode are capable of being set. When the still-picture playback mode has been set, a still picture is produced from the read still-picture data. When the movie playback mode has been set, the read image data of the first field and the read image data of the second field are outputted alternately so that a moving picture can be produced.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 9a and 9b illustrate auxiliary-area data;

FIG. 20b is a sectional view of vertical transfer electrodes and FIG. 20c is a sectional view taken along line XX—XX of FIG. 20a;

FIG. 21a illustrates the relationship between a field shift pulse and signal charge when the field shift pulse is applied to a vertical transfer electrode of the CCD, and FIG. 21b illustrates the relationship between a vertical transfer pulse and signal charge when the vertical transfer pulse is applied to the vertical transfer electrode;

FIG. 22a is a waveform diagram of vertical transfer pulses at the time of still-picture readout, and FIG. 22b is a waveform diagram of vertical transfer pulses at the time of movie readout;

FIG. 27 illustrates an array of CCD filters;

FIG. 28a illustrates the manner in which R data is stored in a memory, FIG. 28b illustrates the manner in which B data is stored in a memory and FIG. 28c illustrates the manner in which G data is stored in a memory;

FIG. 29 illustrates the manner in which wide-band luminance data containing high-frequency components is generated;

FIG. 30 illustrates the manner in which low-frequency component data $R_L$, $G_L$ and $B_L$ of the three primary colors is generated;

DESCRIPTION OF THE PREFERRED EMBODIMENTS

Before discussing the construction and operation of a digital video tape recorder, the existing industrial standard relating to a system for recording on magnetic tape by a digital video tape recorder will be described.

Figure 17A:
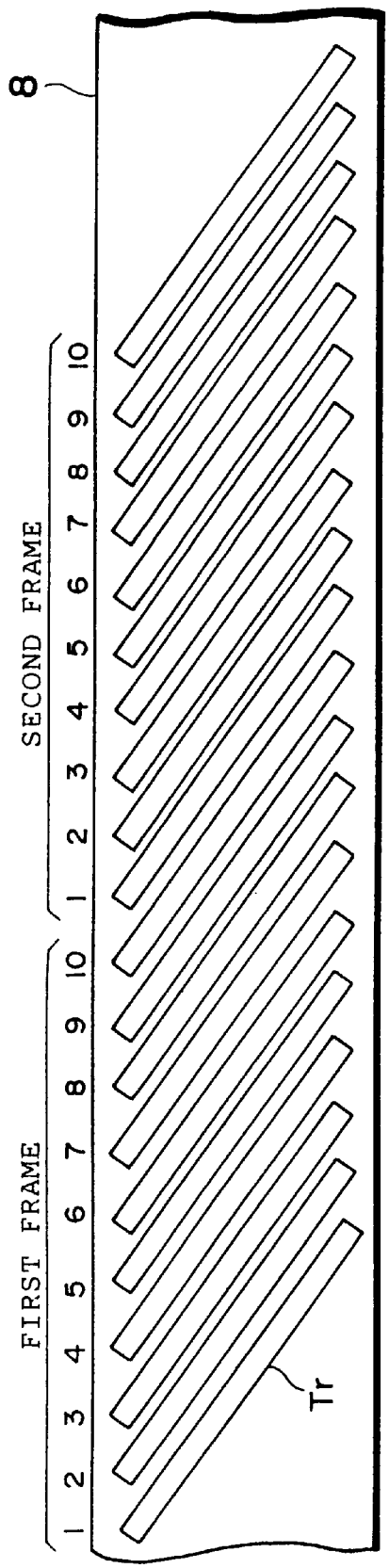
FIG. 17a illustrates the format of a magnetic tape and FIG. 17b shows a track format.
Figure 17B:
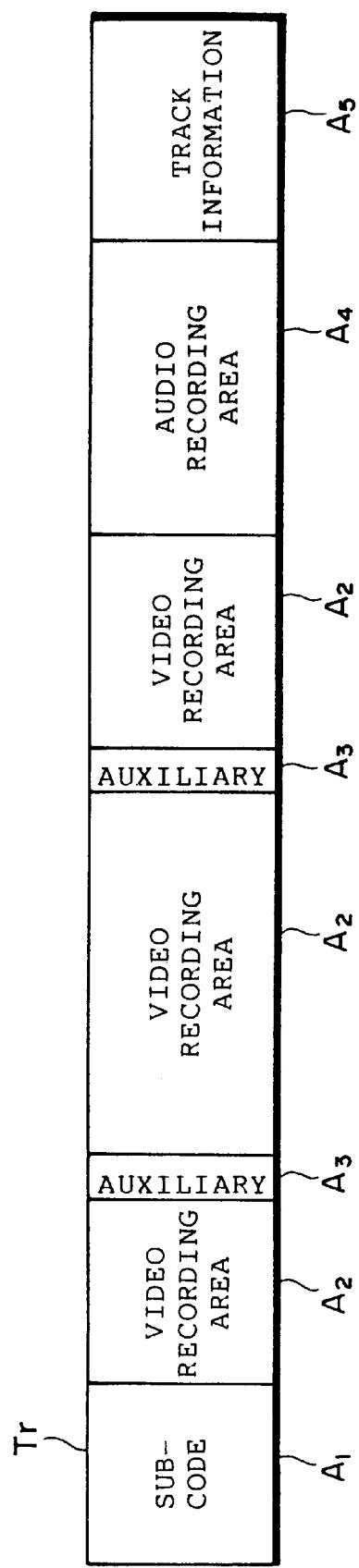

The recording format of a magnetic tape is as illustrated in FIGS. 17a and 17b. FIG. 17a illustrates tracks Tr on a magnetic tape 8. A large number of the tracks Tr are formed diagonally at a fixed angle with respect to the longitudinal direction of the magnetic tape 8. One frame of digital image data is recorded using ten consecutive tracks among the multiplicity of tracks Tr.

FIG. 17b illustrates the track format. One track Tr includes a sub-code recording area, a video recording area, an auxiliary recording area, an audio recording area and a track information recording area. Information such as time codes for high-speed retrieval and absolute track numbers is recorded in the sub-code recording area. Digital image data representing the image of a subject is recorded in the video recording area. Data representing sound is recorded in the audio recording area. Information serving as a reference for the tracks for the purpose of causing the magnetic head to trace the center of the tracks Tr is recorded in the track information recording area. The auxiliary recording area is provided randomly and is used to record additional information. In this embodiment of the invention the details of which will be described later, information relating to image data that has been recorded in the video recording area is recorded in the auxiliary recording area. Gaps provided between the areas are deleted from the drawing.

The CCD used in a digital video tape recorder generally is one having about 350,000 pixels in an array of 720 horizontal pixels and 480 vertical pixels according to the prior art. One frame of digital image data obtained using such a CCD is recorded on ten tracks of the magnetic tape 8. This is the existing standard.

A CCD having a large number of pixels should be used to improve the image quality of the image represented by the image data recorded on the magnetic tape 8. In a digital video tape recorder, however, the standard is so decided that digital image data representing an image of 720 pixels horizontally and 480 pixels vertically is recorded on ten tracks. Consequently, when digital image data representing an image having more than 350,000 pixels is recorded on the magnetic tape 8, the result no longer conforms to the standard. The digital video tape recorder according to the present invention makes it possible to obtain image data representing an image having more than 350,000 pixels and to record image data conforming to the existing recording standard of digital video tape recorders.

Figure 1:
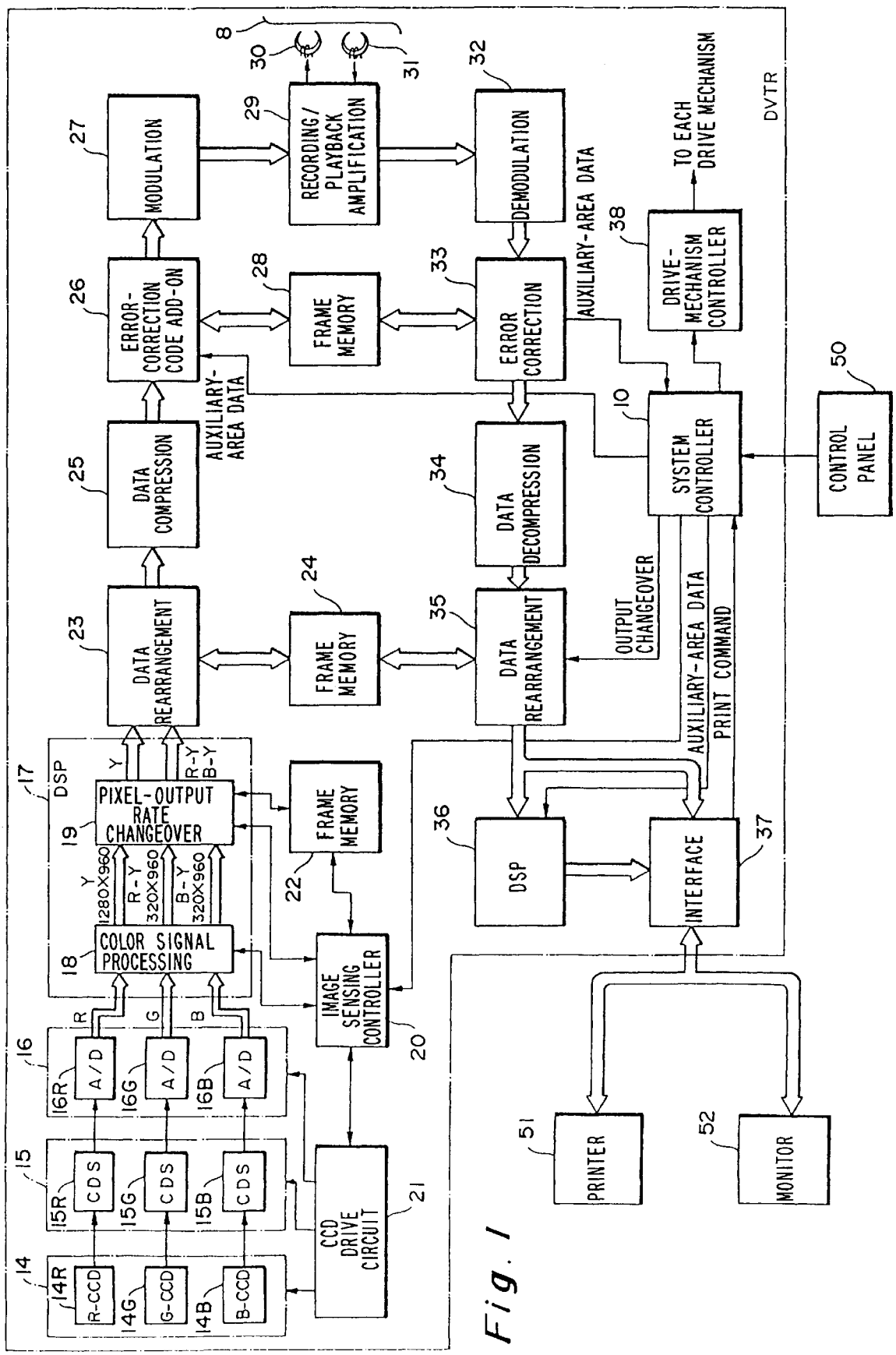
FIG. 1 is a block diagram illustrating the electrical configuration of a digital video tape recorder.

FIG. 1 is a block diagram illustrating an embodiment of the present invention and showing the electrical configuration of a digital video tape recorder (DVTR) capable of recording and playing back digital image data. The overall operation of the digital video tape recorder is supervised by a system controller 10.

The digital video tape recorder is capable not only of photographing a subject but also of reproducing image data that has been recorded on the magnetic tape 8. In addition, photography of a subject capable of being carried out includes movie photography and still photography. The digital video tape recorder is provided with a control panel 50 in order to set these modes.

Figure 2:
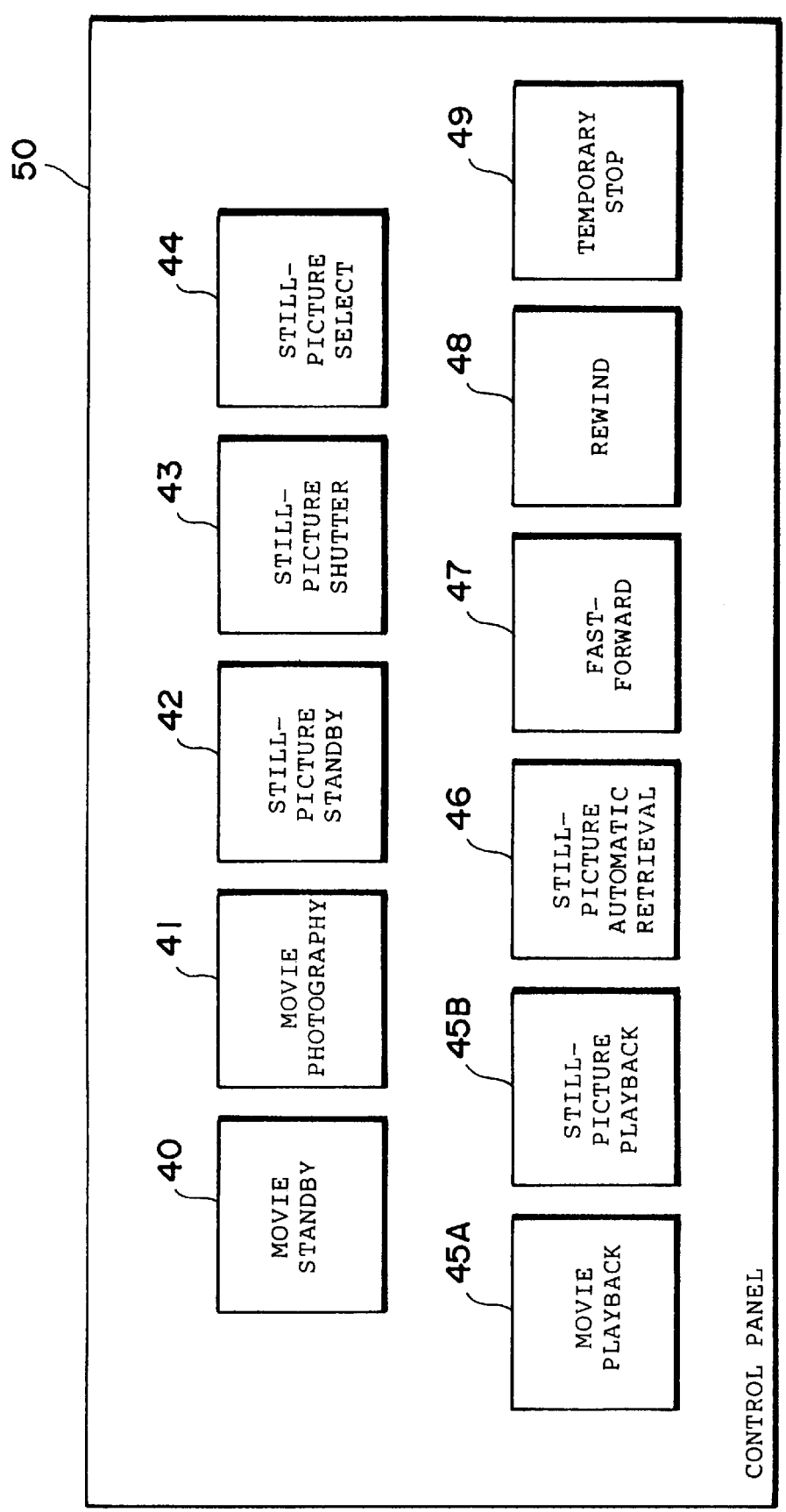
FIG. 2 illustrates a control panel.

As shown in FIG. 2, the control panel 50 includes a movie standby button 40 used to prepare for movie photography, a movie photography switch 41 for setting the beginning and end of movie photography, a still-picture standby button 42 used to prepare for still photography, a shutter lens button 43 for still photography, and a still-picture select switch 44 for selecting a still photography mode from either high-quality still photography or ordinary-quality still photography. The shutter lens button 43 for still photography is of the two-stroke type. The control panel 50 further includes a movie playback switch 45A for setting the beginning and end of movie playback, a still-picture playback button 45B for setting high-quality still-picture synthesizing processing, a still-picture automatic retrieval button 46 for setting a still-picture retrieval mode in which an image obtained by still photography is retrieved and displayed, a fast-forward button 47 for fast-forwarding the magnetic tape 8, a rewind button 48 for rewinding the magnetic tape 8, and a temporary-stop button 49 for temporarily stopping the magnetic tape 8. The setting signals from these various buttons and switches on the control panel 50 are applied to the system controller 10.

In the example shown in FIG. 2, the various buttons and switches are disposed on the single control panel 50. In actuality, however, the buttons and switches would be dispersed over the case of the camera upon taking camera operability into account.

Figure 3:
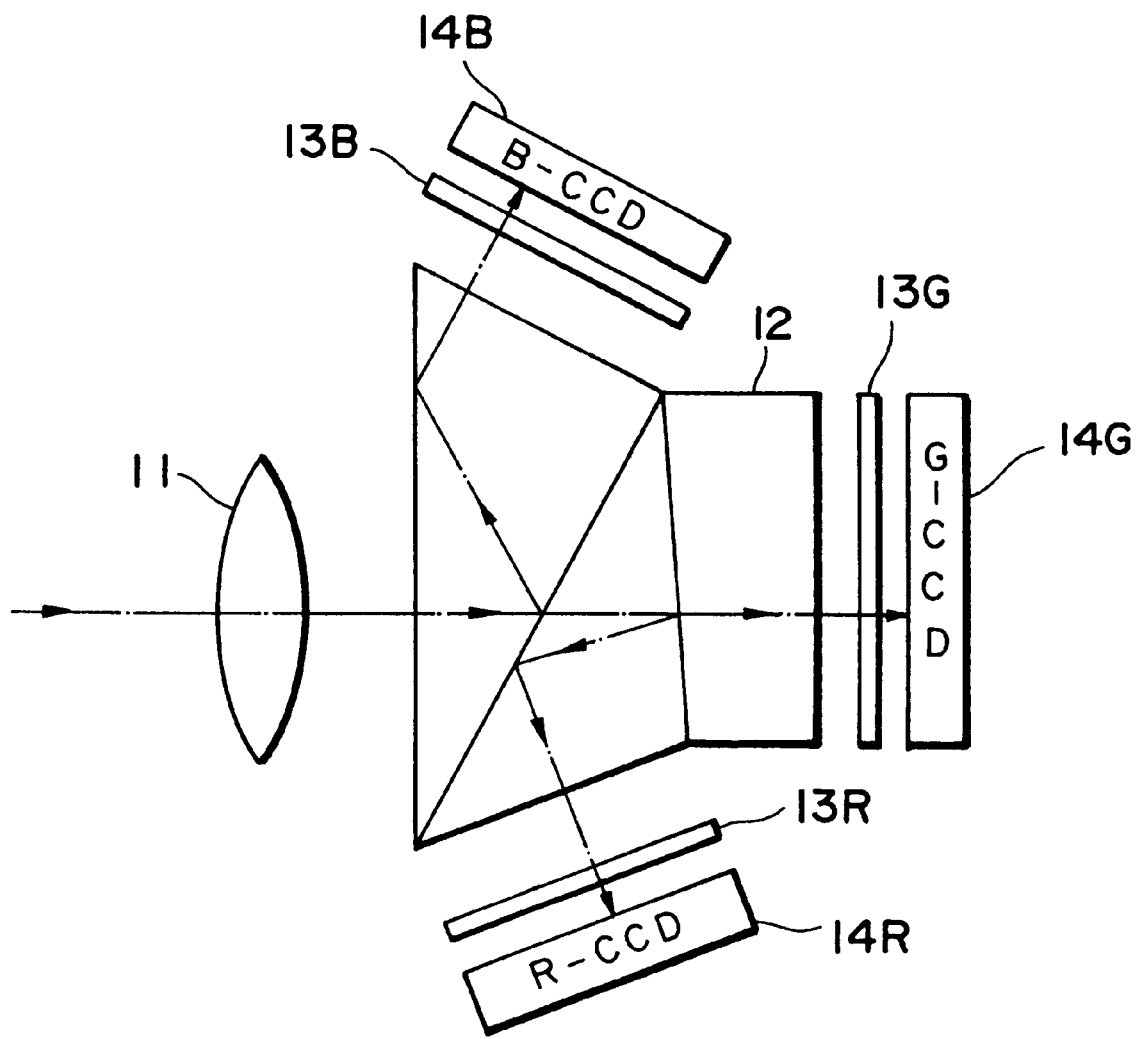
FIG. 3 illustrates the relationship between an image sensing optical system and CCDS.

FIG. 3 illustrates an image sensing optical system which includes CCDs (charge-coupled devices).

The image sensing optical system of the digital video tape recorder includes three CCDS, namely CCDS 14R, 14G and 14B. The CCDs 14R, 14G and 14B each have 640 pixels in the horizontal direction and 480 pixels in the vertical direction. The CCDS 14R, 14G and 14B output video signals of the colors red, green and blue, respectively, and have a red filter 13R, a green filter 13G and a blue filter 13B, respectively, placed in front of them.

A pencil beam of light rays is condensed by an image sensing lens 11 and then introduced to a prism 12. The condensed pencil beam of light rays is divided into three pencil beam of light rays by the prism 12 and these impinge upon the CCDs 14R, 14G and 14B. The prism 12 is so designed that the optical distances of the three divided pencil beam of light rays will be equal to one another.

As shown in FIG. 1, the image sensing section of the digital video tape recorder is controlled by an image sensing controller 20, which controls a CCD drive circuit 21. An image sensing circuit 14 which includes the CCDs 14R, 14G and 14B is controlled by the CCD drive circuit 21, whereby the storage of signal charge in the CCDs 14R, 14G and 14B and the sweep-out of this signal charge is controlled. In the case of movie photography, all the signal charge accumulated in the CCDs 14R, 14G and 14B is outputted as a video signal at a period of ⅙₀ of a second (in the strict sense, $^{1.001}\!/_{60}$ of a second) (all pixels readout).

The video signals of the colors red, green and blue outputted by the CCDs 14R, 14G and 14B, respectively, are applied to CDS (correlated double sampling) circuits 15R, 15G and 15B, respectively, contained in a signal-charge detection circuit 15, whereby kTC noise components are eliminated. The red, green and blue video signals are converted to red, green and blue digital image data in analog/digital (A/D) converter circuits 16R, 16G and 16B, respectively, contained in A/D converter unit 16.

The red, green and blue digital image data is applied to a color signal processing circuit 18 contained in a DSP (digital signal processor) 17. Using the entered digital image data of the colors red, green and blue, the color signal processing circuit 18 generates luminance data composed of 1280 pixels in the horizontal direction and 960 pixels in the vertical direction, as well as R-Y and B-Y color-difference data composed of 320 pixels in the horizontal direction and 960 pixels in the vertical direction. The generation of the luminance data and R-Y, B-Y color-difference data is performed as set forth below.

Figures 4, 5:
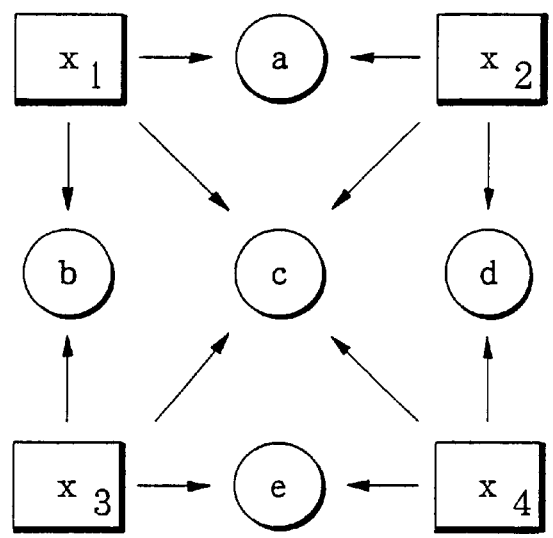
FIG. 4 is a diagram in which the pixels represented by image data of the colors red, green and blue obtained by three CCDs are shown in the same plane.
FIG. 5 illustrates a method of generating interpolated pixels.

FIG. 4 shows the manner in which the images represented by the digital image data of the colors red, green and blue are expressed in the same plane. Pixels represented by the image data of the colors red, green and blue are disposed at intervals every other pixel in both the horizontal and vertical directions. The pixels of the color green are disposed in columns and rows that differ from the columns and rows in which the pixels of the colors red and blue appear. The pixels between these sporadically distributed pixels have no image data and are blank areas. Image data for the pixels in these blank areas is generated.

FIG. 5 illustrates the manner in which pixels are generated. In FIG. 5, the characters a, b, c, d and e are pixels that are devoid of image data. The characters $x_1$, $x_2$, $X_3$ and $X_4$ are pixels in which image data is present. The image data of the pixels denoted by the characters a, b, c, d, and e is generated in the following manner:

$a=(x_1+x_2)/2$
$b=(x_1+x_3)/2$
$C=(x_1+x_2+x_3+x_4)/4$
$d=(x_2+x_4)/2$
$e=(x_3+x_4)/2$

By virtue of these operations, red, green and blue image data composed of 640 pixels horizontally and 480 pixels vertically is used to obtain red, green and blue image data composed of 1280 pixels horizontally and 960 pixels vertically, which is twice the number of number of pixels in both the horizontal and vertical directions. From red, green and blue image data composed of 1280 pixels horizontally and 960 pixels vertically, luminance data as well as R-Y and B-Y color-difference data composed of 1280 pixels horizontally and 960 pixels vertically is generated. The R-Y and B-Y color-difference data is subjected to sampling processing in such a manner that the number of pixels in the horizontal direction is reduced to one-fourth. As a result, the R-Y and B-Y color-difference data becomes color-difference data composed of 320 pixels horizontally and 960 pixels vertically. The luminance data and the R-Y, B-Y color-difference data outputted by the color signal processing circuit 18 is applied to a pixel output-rate changeover circuit 19. The pixel output-rate changeover circuit 19 is a circuit which changes the method of outputting image data and the amount of image data in dependence upon the mode set in the control panel 50.

Figure 6:
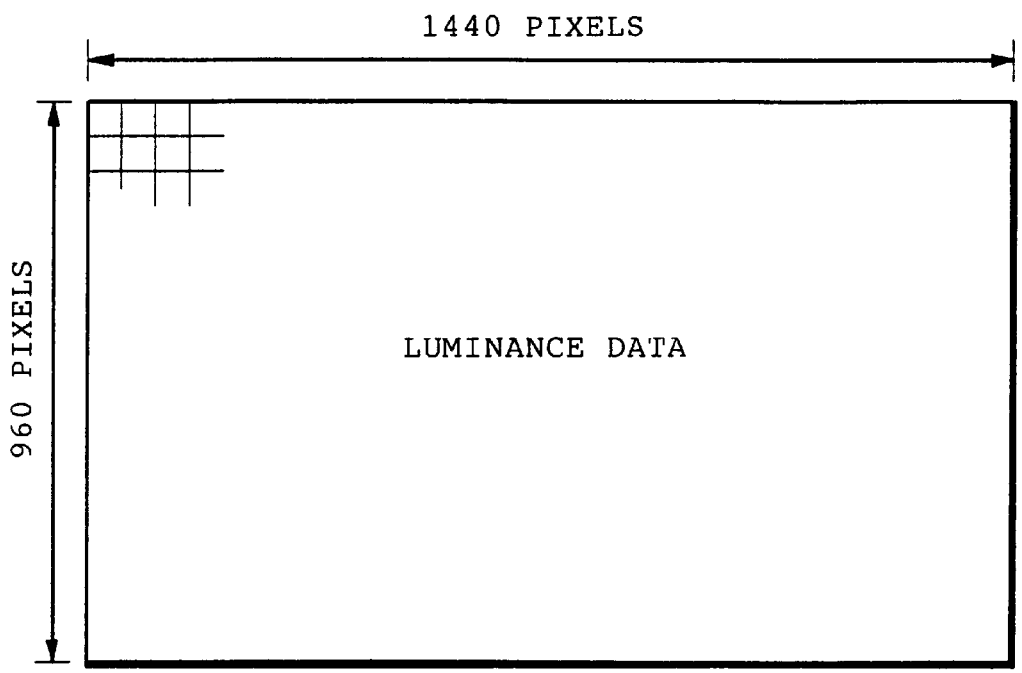
FIG. 6 illustrates an image represented by luminance data obtained by a high-quality still-picture photography mode.

When the high-quality still-picture recording mode has been set by the control panel 50, image-data interpolation processing is executed and luminance data composed of 1440 pixels horizontally and 960 pixels vertically, in the manner illustrated in FIG. 6, from luminance data composed of 1280 pixels horizontally and 960 pixels vertically. As a result, luminance data composed of approximately 1,400,000 pixels is obtained. This is an amount of data that is four times that (about 350,000 pixels) of one frame of data in the prior art. This luminance data of about 1,400,000 pixels is divided into four frames and outputted from the pixel output-rate changeover circuit 19. The method of dividing up this luminance data is as set forth below.

Figure 8:
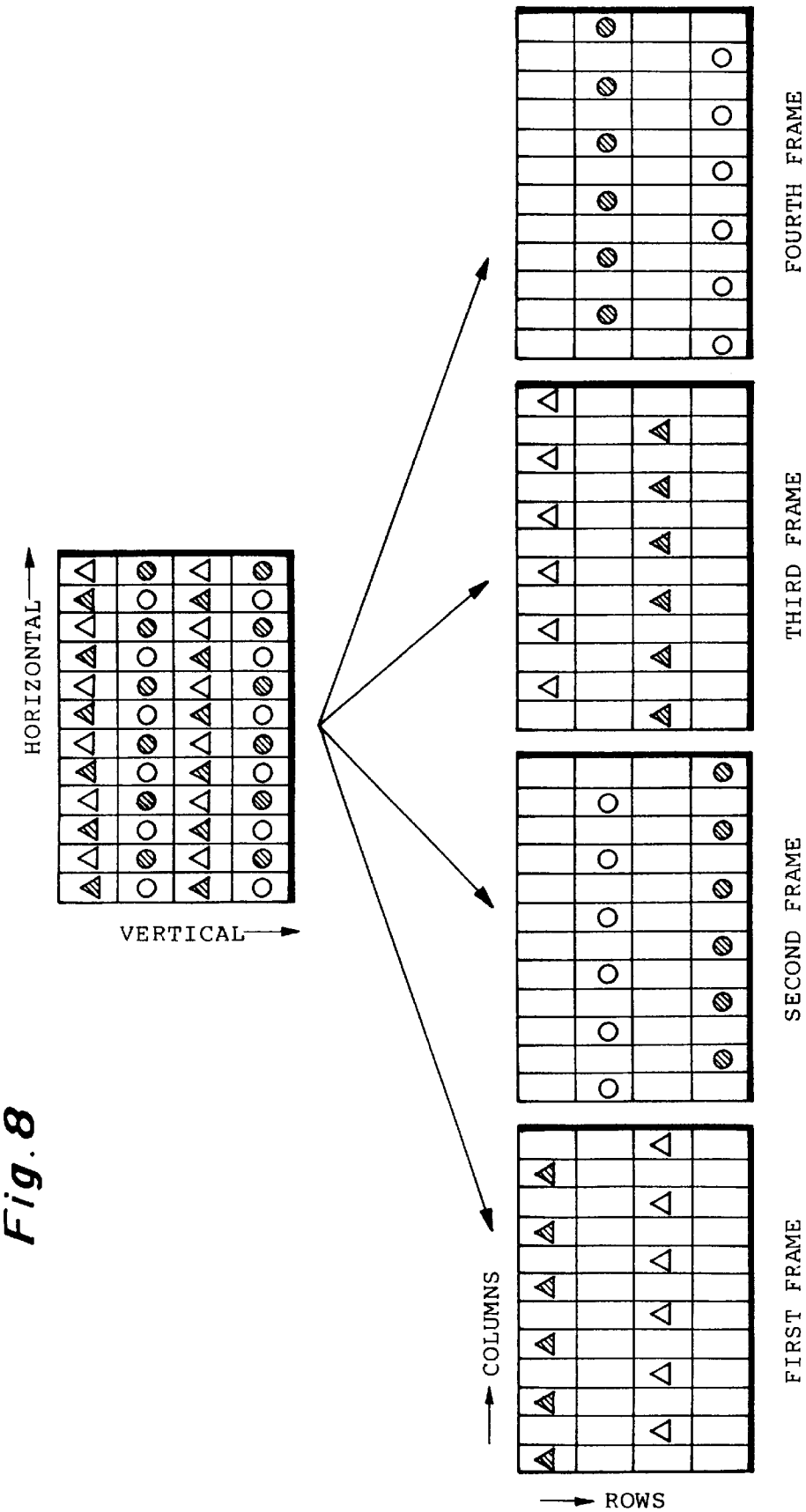
FIG. 8 illustrates a method of partitioning an image.

FIG. 8 schematically illustrates the manner in which the luminance data composed of the pixels shown in FIG. 6 is partitioned into four frames. In order to simplify the drawing, the numbers of pixels are drawn to be much fewer than in actuality in both the horizontal and vertical directions. As shown in the upper half of FIG. 8, one frame of luminance data includes image data regarding all horizontal and vertical pixels (1440 pixels horizontally and 960 pixels vertically) shown in FIG. 6. The luminance data corresponding to all pixels shown in FIG. 6 is stored in a frame memory 22.

Readout of luminance data from the frame memory 22 is performed over four frames from the first to the fourth frames (i.e., over four times; each time for one frame) (see the lower half of FIG. 8).

The luminance data of the first frame, which is read out first, and the luminance data of the third frame, which is read out third, is luminance data in which the pixels are in odd-numbered rows. The luminance data in the odd rows is expressed by black triangle marks and white triangle marks. The black triangles indicate luminance data in odd columns, and the white triangles indicate luminance data in even-numbered columns. The luminance data of the first frame is composed of luminance data in odd- and even columns repeated alternately in the vertical direction. The luminance data of the third frame is composed of luminance data in odd- and even columns repeated alternately in the vertical direction and is data that is not contained in the first frame.

The luminance data of the second frame, which is read out second, and the luminance data of the fourth frame, which is read out fourth, is luminance data in which the pixels are in even rows. The luminance data in the even rows is expressed by black circle marks and white circle marks. The white circles indicate luminance data in odd columns, and the black circles indicate luminance data in even columns. The luminance data of the second frame is composed of luminance data in odd- and even columns repeated alternately in the vertical direction. The luminance data of the fourth frame is composed of luminance data in odd- and even columns repeated alternately in the vertical direction and is data that is not contained in the second frame.

The other methods of portioning image data into four frames than above may be adopted. For example, such a method may be used that will be explained with reference to FIG. 26, in which the luminance data of the first frame is composed of luminance data in odd rows and odd columns, the luminance data of the second frame is composed of luminance data in even rows and odd columns, the luminance data of third frame is composed of luminance data in odd rows and even columns, the luminance data of the fourth frame is composed of luminance data in even rows and even columns.

Thus, the luminance data of all pixels is read out only one time in any frame. Moreover, the pixels of the luminance data constructing each frame are dispersed in the vertical and horizontal directions and the image of the subject can be expressed in its entirety by luminance data in any frame whatsoever.

Readout of the image data over these four frames can readily be expressed by controlling the addressing of the frame memory 22. For example, in the readout of the first frame, an odd row is designated as the vertical address. As for the horizontal address, it will suffice to generate an address signal which designates an odd column when the row is an (4m+1)th row and an address signal which designates an even column when the row is the (4m+3)th row (where m=0, 1, 2, . . . ). Readout of one frame of image data should be performed in 1/30 of a second. This generation of address signals can be executed by the system controller 10 or implemented by a counter, frequency divider, logic circuit, etc.

Figure 7:
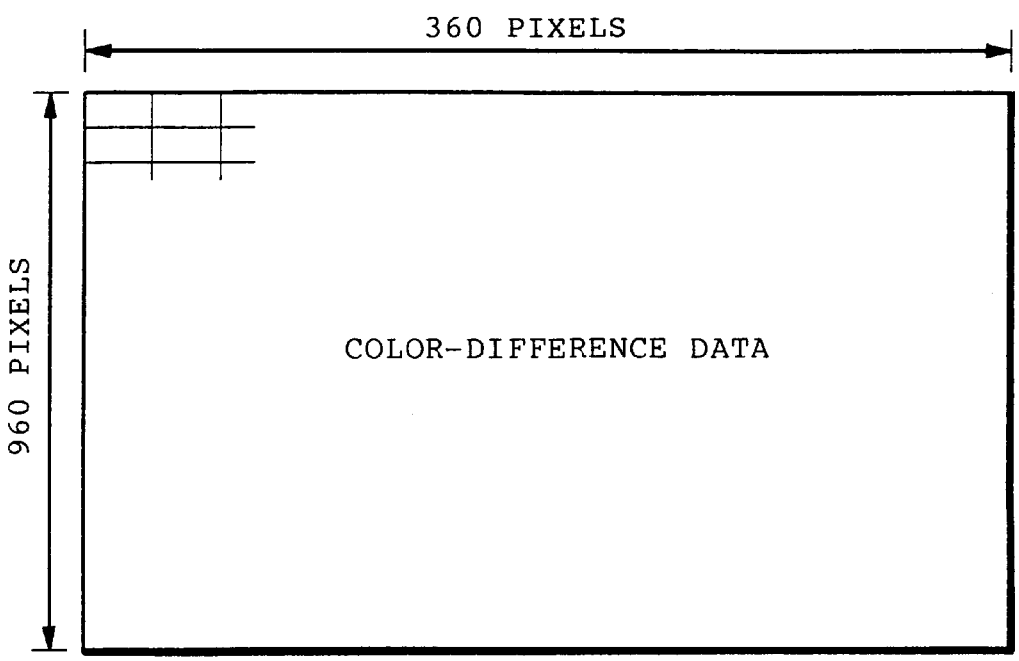
FIG. 7 illustrates an image represented by color-difference data obtained by a high-quality still-picture photography mode.

With regard to the R-Y and B-Y color-difference data, pixel interpolation processing is performed in the pixel output-rate changeover circuit 19, color-difference data composed of 360 pixels horizontally and 960 pixels vertically is generated from 320 pixels in the horizontal direction and 960 pixels in the vertical direction, as shown in FIG. 7, and the color-difference data is applied to the frame memory 22, where this data is then stored. The color-difference data stored in the frame memory 22 also is partitioned into four frames in the same manner as the luminance data, and the color-difference data is read out of the frame memory 22.

It goes without saying that the frame memory 22 is capable of storing four frames of luminance data, R-Y color-difference data and B-Y color-difference data.

The luminance data partitioned into four frames and outputted from the pixel output-rate changeover circuit 19 is applied to data rearrangement circuit 23. Further, the R-Y and B-Y color-difference data is outputted from the pixel output-rate changeover circuit 19 alternately in predetermined amounts of data, and this outputted color-difference data is applied to the data rearrangement circuit 23.

When the ordinary still-picture recording mode has been set on the control panel 50, pixel eliminating processing is performed in the pixel output-rate changeover circuit 19 so that luminance data composed of 720 pixels horizontally and 480 pixels vertically is generated from input luminance data composed of 1280 pixels horizontally and 960 pixels vertically and color-difference data composed of 180 pixels horizontally and 480 pixels vertically is generated from input color-difference data composed of 320 pixels horizontally and 960 pixels vertically. The generated luminance data, R-Y and B-Y color-difference data is applied to the data rearrangement circuit 23.

When the movie recording mode has been set by the control panel 50, first luminance data composed of 720 pixels horizontally and 480 pixels vertically as well as R-Y and B-Y color-difference data composed of 180 pixels horizontally and 480 pixels vertically is generated in the same manner as in the ordinary still-picture recording mode. Two items of image data (luminance data and color-difference data) which are shifted by 1/60 of a second are regarded as being a first field of image data and as being second field of image data, respectively. That is, of the first image data, the image data of odd rows is treated as being the first field of image data, and of the next image data which is obtained 1/60 of a second later, the image data of even rows is treated as being the second field of image data. The first field of image data and the second field of image data are alternately outputted from the image output-rate changeover circuit 19 and applied to the data rearrangement circuit 23.

The image data outputted by the pixel output-rate changeover circuit 19 is applied to a frame memory 24 through the data rearrangement circuit 23. The data is stored in the frame memory 24 temporarily. The image data that has been stored in the frame memory 24 is applied to the data rearrangement circuit 23. Here processing for dividing the image data into a number of blocks of 8×8 pixels each and processing for rearranging the image data conforming to the standard of the digital video tape recorder is executed.

The image data outputted by the data rearrangement circuit 23 is applied to a data compression circuit 25 successively starting from the image data of the first frame. The data compression circuit 25 subjects the image data to data compression by applying DCT (discrete cosine transform) processing, quantization processing, etc. The image data compressed in the data compression circuit 25 is applied to a frame memory 28 via an error correction code add-on circuit 26 (i.e., the data is merely passed through the circuit 26). The frame memory 28 stores the compressed data temporarily.

The image data that has been stored in the frame memory 28 is successively applied to the error correction code add-on circuit 26, where an error correction code is added on. The image data to which the error correction code has been added is applied to the frame memory 28 again. Here the data is stored. The image data is read out of the frame memory 28 again and applied to the error correction code add-on circuit 26. The latter is also provided with auxiliary-area data from the system controller 10.

The auxiliary-area data is information relating to digital image data obtained by photography of a subject, and data representing other information. An example of auxiliary-area recording data is shown in FIGS. 9a and 9b. As shown in FIGS. 9a and 9b, the auxiliary-area recording data is eight-bit data, and five types of data are recorded in one auxiliary recording area.

The auxiliary-area data includes a source control pack, a source pack, and maker option data. The maker option data includes a header, a maker code, total number option packs, mode setting of the recording scheme, partitioning method, information representing the number of the present frame, information indicating a method of displaying or inserting data on a display unit, and recording-area data representing a video recording area in which partitioned image data is stored. The source control pack is data which, by way of example, indicates whether or not copying of the digital image data recorded on the magnetic tape 8 is prohibited. The source pack is data which, in a case where both frame-image movie recording and field-image movie recording are possible, indicates in which of these modes recording has been performed.

The header is the data at the beginning of the five types of data recorded in one auxiliary recording area and indicates the type of the remaining four types of data. The maker code is a code indicating the particular maker of the digital video tape recorder that recorded the digital image data. The total number of option packs indicates the number of items of auxiliary-area data capable of being recorded in an auxiliary recording area. The mode setting of the recording scheme represents the image-data output mode setting set in the DSP circuit 17 when digital image data is recorded. The partitioning method indicates the manner in which partitioning is performed in a case where image data is partitioned in the manner shown in FIG. 8 when the digital image data is recorded. The information indicating the number of the present frame represents the particular number of an item of image data in a case where image data constructing one frame has been partitioned into a plurality of portions. The method of displaying or inserting data on a display unit indicates the manner in which one frame is generated and displayed on the display unit at the time of playback in a case where the image data is partitioned at recording time.

These items of auxiliary-area data are generated by the system controller 10 and added onto the image data (auxiliary area). The track format is determined in advance, as shown in FIG. 17b, and so are the positions of auxiliary recording areas $A_3$. Accordingly, auxiliary-area recording data can be distinguished from other data based upon the recording positions of the areas $A_3$.

With regard to the image data representing the image of the first frame, the auxiliary-area data representing the particular number of this frame is expressed by "00000010", for example, as shown in FIG. 9b. With regard to the image data representing the image of the second frame, the auxiliary-area data representing the particular number of this frame is expressed by "00000001", for example.

The image data outputted by the error correction code add-on circuit 26 is applied to a modulator circuit 27, where the image data is coded (by NRZI coding, for example) before being applied to a recording/playback amplifier circuit 29. The image data that has been amplified in the recording/playback amplifier circuit 29 is applied to a magnetic head 30. As a result, image data is recorded by the magnetic head 30 in a video recording area $A_2$ of each track on the magnetic tape 8, and auxiliary area data is recorded by the magnetic head 30 in the auxiliary recording area $A_3$ of each track. Recording of audio data and track information also is performed as a matter of course. The initial one frame with an amount of image data of approximately 1,400,000 pixels obtained in the high-quality still-picture recording mode, namely in the four frames of image data, corresponds to the amount of data in one frame of image data obtained by photographing a subject using the 350,000-pixel CCD employed normally. The image data therefore is recorded in video recording area $A_2$ on ten consecutive tracks thereof. The next frame of image data in the four frames of image data is recorded in the video recording area $A_2$ on ten tracks that follow the image data of the initial frame of image data already recorded. The next frame of image data in the four frames of image data is recorded in the video recording area $A_2$ on the next ten tracks thereof, and the final frame of image data in the four frames of image data is recorded in the video recording area $A_2$ on the next ten tracks thereof. Since one frame of image data having an amount of image data of about 1,400,000 possesses four times the amount of data contained in one frame of image data obtained using the 350,000-pixel CCD employed normally, this data is recorded on the magnetic tape 8 using 40 tracks. The operation for recording the four frames is performed at a period of $\frac{1}{7.5}$ of a second in the same manner that four frames of photography is carried out.

The image data having the amount of image data of about 350,000 pixels obtained in the ordinary still-picture recording mode and the image data having the amount of image data of about 350,000 pixels obtained in the movie recording mode is recorded in the video recording area $A_2$ on ten consecutive tracks thereof.

When the image data has been recorded on the magnetic tape 8 by the high-quality or ordinary still-picture recording mode, a still-picture identification code is recorded in the sub-code area.

The digital video tape recorder shown in FIG. 1 is also capable of reproducing digital image data that has been recorded on the magnetic tape 8. The playback mode includes a movie playback mode and a still-picture automatic retrieval mode.

In the mode for playing back digital image data, the image data, auxiliary-area data and other data recorded on the magnetic tape 8 is read out by the magnetic head 31 and applied to the recording/playback amplifier circuit 29. The data amplified by the recording/playback amplifier circuit 29 is applied to a demodulator circuit 32. Data demodulation is performed by the modulator circuit 32 and the demodulated data is applied to and temporarily stored in the frame memory 28 via an error correction circuit 33. The data that has been recorded in the frame memory 28 is read out and applied to the error correction circuit 33. If the data demodulated by the demodulator circuit 32 contains a data error, then error correction processing is executed in the error correction circuit 33. The digital image data representing the image of the subject in the data that has been subjected to error correction processing is applied to a data decompression circuit 34, and the auxiliary-area data contained in the data that has been subjected to error correction processing is applied to the system controller 10. The playback operation also is performed at a period of $\frac{1}{7.5}$ of a second with regard to four frames of image data.

In the movie playback mode, compressed image data is subjected to data decompression processing in the data decompression circuit 34. The digital image data that has been decompressed in the data decompression circuit 34 is applied to a data rearrangement circuit 35. Here the array of image data conforming to the standard of the digital video tape recorder is restored to the array of the display image in a monitor display unit 52.

In the movie playback mode, the data rearrangement circuit 35 is controlled by the system controller 10 in such a manner that the image data outputted by the data rearrangement circuit 35 is applied to an interface 37.

The digital image data outputted by the data rearrangement circuit 35 is applied to the monitor display unit 52 one field at a time via the interface 37 and a moving picture is played back. The monitor display unit 52 may be provided in the digital video tape recorder.

The digital video tape recorder illustrated in FIG. 1 is also capable of high-quality still-picture playback in addition to movie playback. In the high-quality still-picture playback mode, the image data outputted by the data rearrangement circuit 35 is applied to a DSP circuit 36. The auxiliary-area data from the system controller 10 also is applied to the DSP circuit 36. Which image data to use to generate one complete frame of an image can be determined from the data representing the particular number of the present frame, and how to combine the partitioned image data to generate one complete frame of an image can be determined from the data representing the partitioning method, these items of data being contained in the auxiliary-area data provided by the system controller 10. On the basis of the data representing the particular number of the present frame and the data representing the partitioning method, one complete frame of an image is generated in the DSP circuit 36. As a result, one frame of a high-quality image shown in the upper half of FIG. 8 is obtained from the four images shown in the lower half of FIG. 8.

The one frame of image data generated in the DSP circuit 36 is applied to a printer 51 via the interface 37, whereby a high-quality still picture is printed out.

It is stated above that image data having four times as much image data as that obtained from an ordinary CCD is acquired, partitioned into four frames and recorded on magnetic tape. However, the amount of image data is not limited to four times that obtained from an ordinary CCD. An arrangement may be adopted wherein image data having an amount of data in which the number of pixels is any whole-number multiple n (n=2, 3, 4, 5, . . . ) of the number of pixels in the image data from the ordinary CCD is obtained to acquire one frame of image data. In such case the image data obtained would be partitioned into n-number of frames and recorded on the magnetic tape in conformity with the amount of image data.

Though each of the circuits mentioned above is constituted by hardware, some of the hardware circuitry can be implemented by software.

Figure 10:
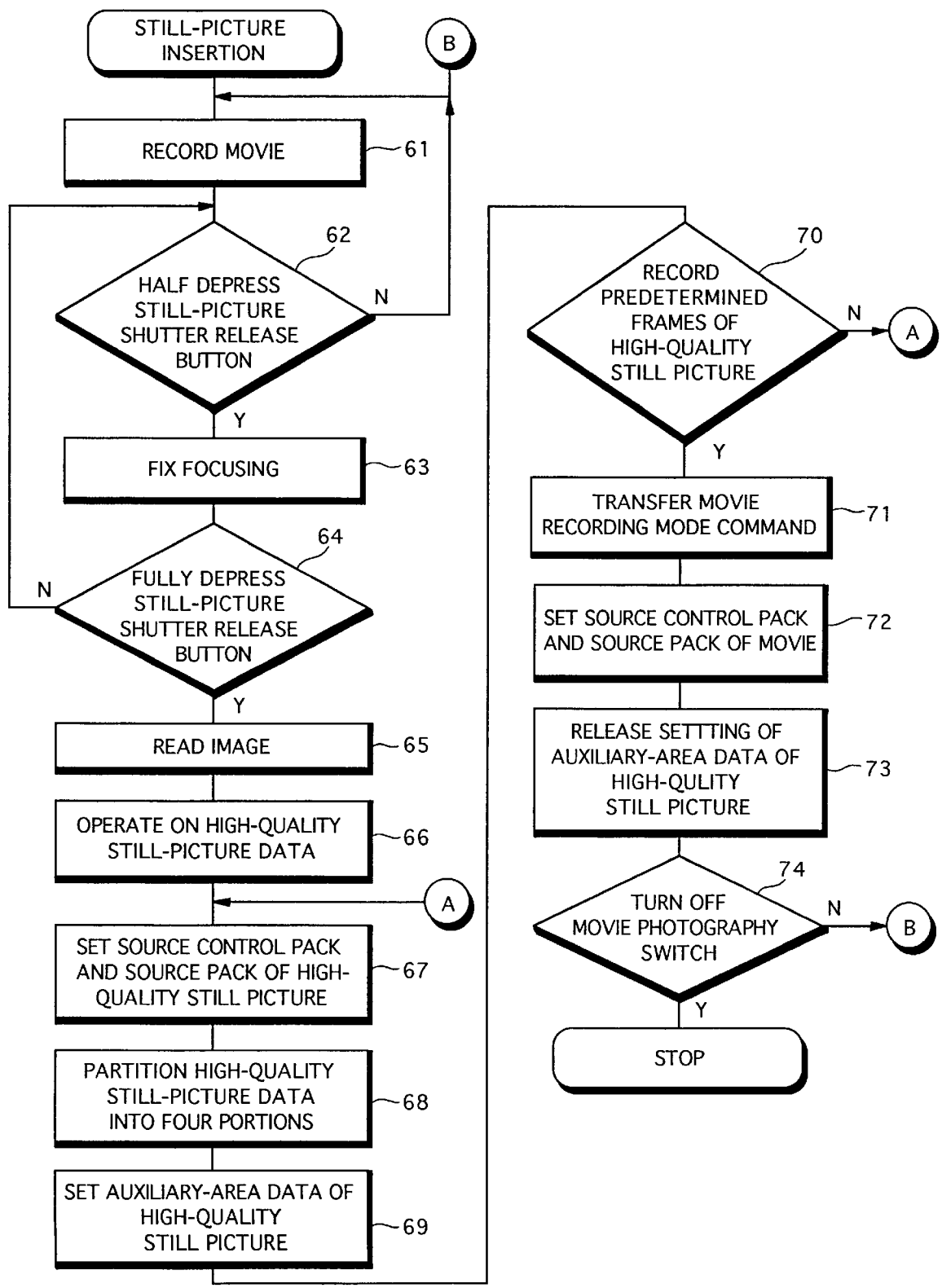
FIG. 10 illustrates processing for a case where high-quality still-picture photography is performed during recording of image data in movie photography.
Figure 11:
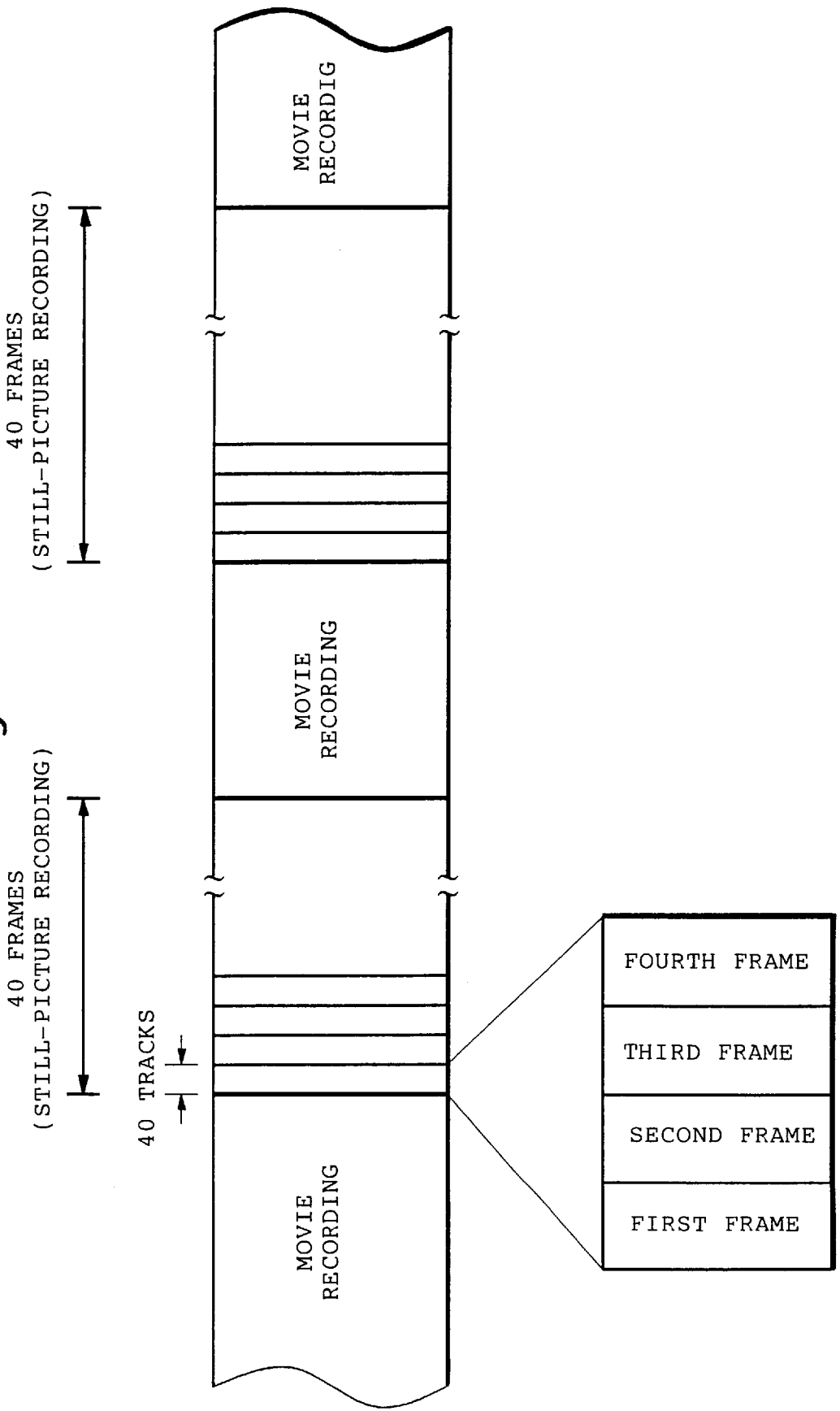
FIG. 11 illustrates the content of a magnetic tape for a case where high-quality still-picture photography is performed during recording of image data in movie photography.

FIG. 10 is a flowchart illustrating a processing procedure executed when recording of a high-quality still picture is performed during recording of a movie, and FIG. 11 illustrates the content of the magnetic tape 8 at this time.

The movie standby button 40 is turned on (pressed) to establish the movie standby state. If the movie photography button 41 is pressed in this state, photography of the subject begins (step 61). As a result, the first field and second field of field image data are alternately applied to the data rearrangement circuit 23 and recorded on the magnetic tape 8 in the manner set forth above.

If the still-photography shutter-release button 43 is pressed half way during moving recording (YES at step 62), focusing is fixed at this timing (step 63). If the still-photography shutter-release button 43 is pressed fully (YES at step 64), image data representing the image of the subject is stored in the frame memory 22 in the manner described above. When high-quality still-picture recording is carried out, the high-quality still-picture recording mode is set by the still-picture select switch 44. As a result, high-quality image data of about 1,400,000 pixels is generated in the DSP 17 and this data is stored in the frame memory 22 (steps 65, 66).

Next, the source control pack and the source pack are set (step 67). High-quality still-picture data composed of about 1,400,000 pixels stored in the frame memory 22 is read out. As shown in FIG. 8, each item of the high-quality still-picture data possesses about 350,000 pixels of image data and is partitioned into four frames in such a manner that one frame of an image is represented. The image data partitioned into four frames is applied to the data rearrangement circuit 23 one frame at a time (step 68). Further, auxiliary-area data (maker option data) is set, with the exception of the source control pack and source pack already set (step 69). The set auxiliary-area data is applied to the error correction-code add-on circuit 26, where the data is added onto each item of image data partitioned into four frames.

In the high-quality still-picture recording mode, 40 frames of the same still picture are recorded. This is to facilitate the retrieval of still pictures during movie playback. In the high-quality still-picture recording mode, 40 tracks of four frames are used to record one frame of about 1,400,000 pixels of image data on the magnetic tape 8. Accordingly, 1600 tracks of 160 frames are used to record 40 frames of the same still picture. Recording of image data is repeated until the recording of 40 frames ends.

When the recording of 40 frames ends (YES at step 70), a command for the movie recording mode is applied to the image sensing controller 20 in order to restore the movie recording (step 71). The source control pack and source pack regarding the image data obtained in the movie recording mode are set (step 72) and the setting of the auxiliary-area data regarding the high-quality still-picture data ends (step 73). The setting of the auxiliary-area data regarding the image data obtained by the movie recording mode naturally continues during movie recording, and the auxiliary-area data that has been set is added onto the image data.

The processing illustrated in FIG. 10 continues until the movie photography switch 41 is turned off (step 74).

As a result of the processing shown in FIG. 10, high-quality still-picture data is recorded during movie recording, as illustrated in FIG. 11.

Figure 12:
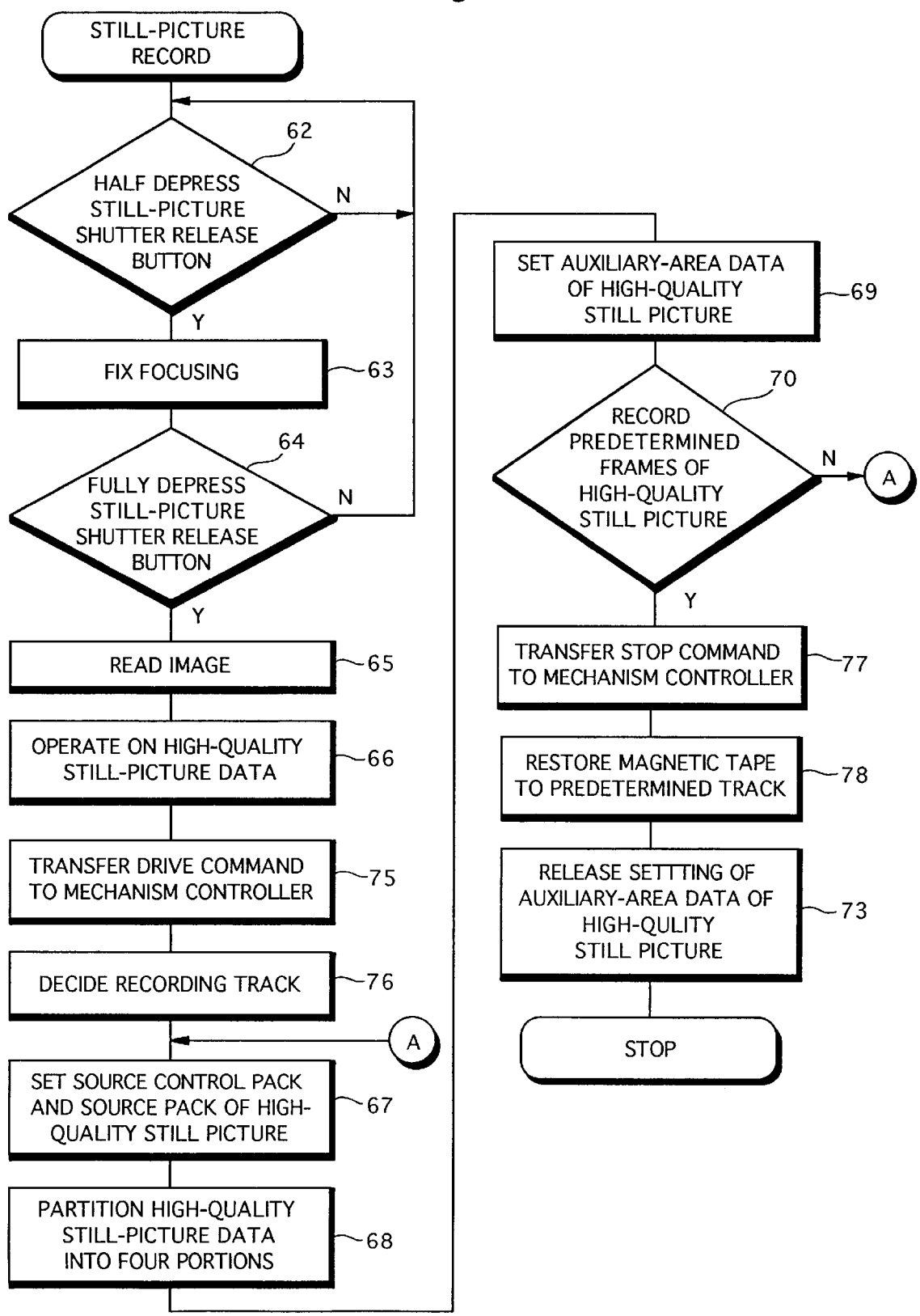
FIG. 12 illustrates processing of a high-quality still-picture recording mode.
Figure 13:
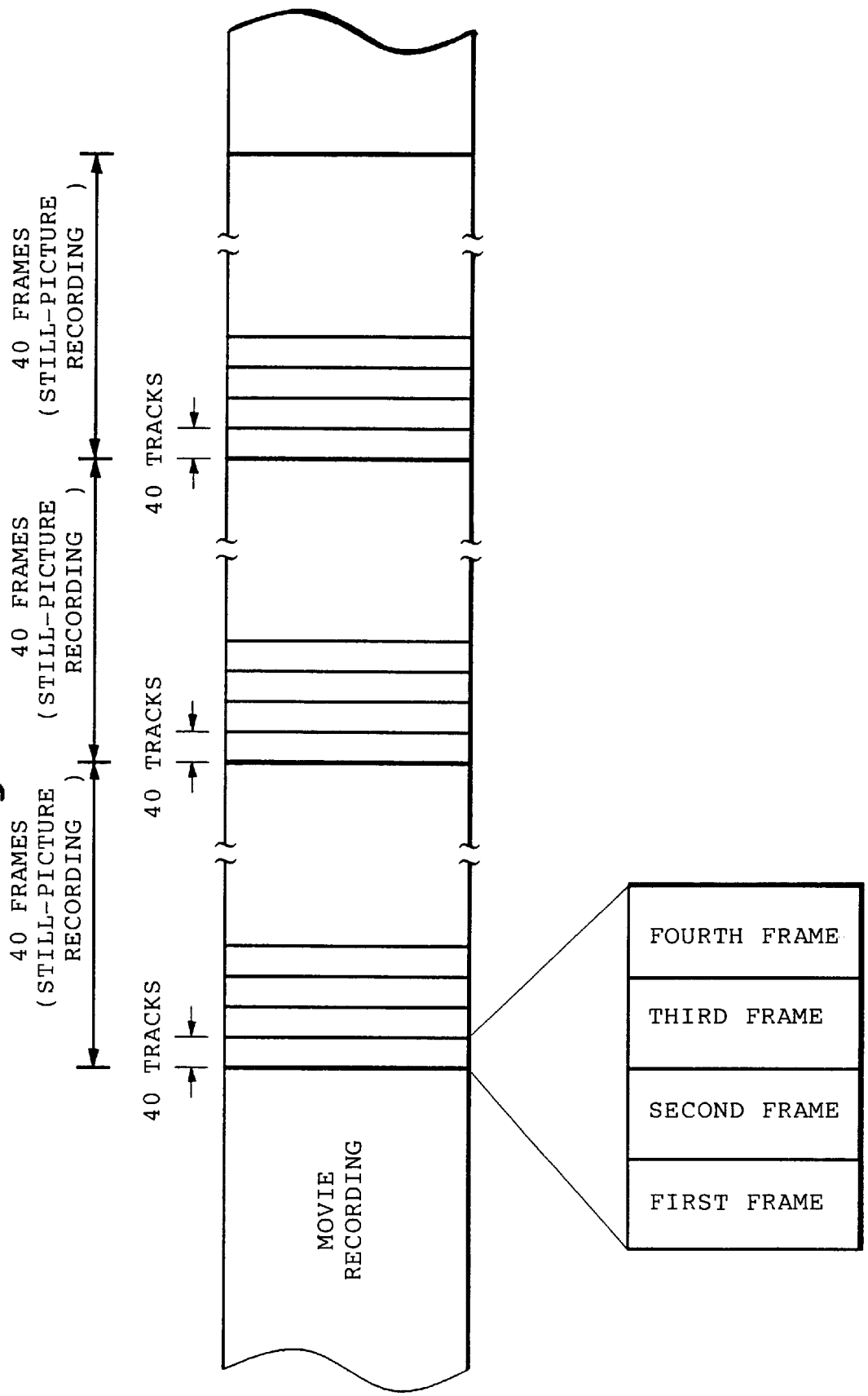
FIG. 13 illustrates the content of a magnetic tape on which image data has been recorded by the high-quality still-picture recording mode.

FIG. 12 is a flowchart illustrating the processing executed when the digital video camera is used as a still video camera. Steps in FIG. 12 that are identical with those shown in FIG. 10 are designated by like step numbers and need not be described again. FIG. 13 shows the manner of recording on the magnetic tape 8 when the digital video camera is used as a still video camera.

By fully pressing the still-picture shutter-release button 43, image data possessing an amount of data conforming to the mode (high-quality still-picture recording mode or ordinary still-picture recording mode) designated by the still-picture select switch 44 is stored in the frame memory 22. It is assumed here that the high-quality still-picture recording mode has been set by the still-picture select switch 44.

In the case where the camera is used as a still video camera, the magnetic tape 8 is stopped, and so is the motor that drives the magnetic tape 8, prior to photography. It takes some time for the drive motor to rotate normally once it has been started. When the still-picture shutter-release button 43 has been fully pressed, therefore, a drive command is applied to a drive-mechanism controller 38 to start the rotation of the drive motor before image data is recorded on the magnetic tape 8 (step 75). Further, the magnetic tape 8 is played back and the absolute track number that has been recorded in the sub-code recording area of the magnetic tape 8 is read. On the basis of the absolute track number read, the track on which image data has been stored last is retrieved (step 76).

When image data making up 40 frames of still pictures has been recorded on the magnetic tape 8 (YES at step 70), a stop command is applied to the drive-mechanism controller 38 to halt the drive motor of the magnetic tape 8 (step 77). In order to prevent the creation of a blank track owing to feeding of the magnetic tape 8 before the drive motor has a chance to start rotating normally in a case where recording of the next still picture is performed, the magnetic tape 8 is rewound slightly so as to position the magnetic head 18 at the next blank track when the drive motor has begun rotating normally.

By virtue of the processing shown in FIG. 12, still-picture data is recorded in the manner illustrated in FIG. 13.

Figure 14:
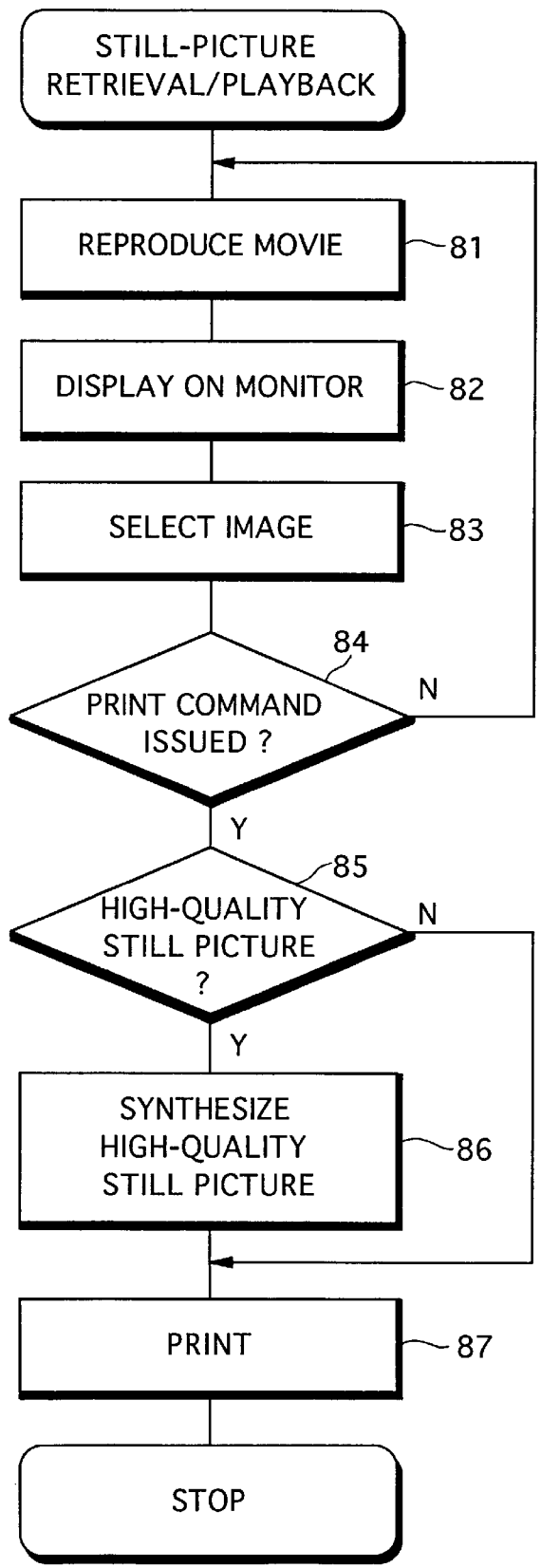
FIG. 14 illustrates processing for performing movie reproduction, retrieving an image to be printed and printing the image.

FIG. 14 is a flowchart illustrating the processing procedure executed when movie playback is performed and an image to be printed is retrieved and printed out.

First, the desired magnetic tape 8 is placed in the digital video tape recorder. The movie playback switch 45A is closed so that the image that has been recorded on the magnetic tape 8 is read by the magnetic head 31. The read image data is subjected to playback processing such as demodulation in the demodulator circuit 32 (step 81) and the processed data is applied to the monitor display unit 52. As a result, a movie image is displayed on the display screen of the monitor display unit 52 (step 82).

While observing the movie image displayed on the monitor display unit 52, the user looks for an image to be printed (step 83). If necessary, the fast-forward button 47 or rewind button 48 is pressed so that fast-forward movie playback or rewind movie playback is performed. When the image to be printed is found by the user, the temporary-stop button 49 is pressed. As a result, the desired image is displayed in a state in which it is frozen on the display screen of the monitor display unit 52. The photography mode, which represents whether the image has been recorded on the magnetic tape 8 by the high-quality still-picture photography mode, by the ordinary still-picture photography mode or by the movie photography mode, also is displayed on part of the frozen image. By observing the photography mode, the user can check the quality of the image being displayed on the monitor display unit 52.

In a case where the image quality of the image being displayed on the monitor display unit 52 is satisfactory, the user causes a print command to be sent from the printer 51 to the digital video tape recorder (YES at step 84). If the image quality of the image being displayed on the monitor display unit 52 is unsatisfactory, the user presses the fast-forward button 47 or the rewind button 48 and looks for an image having the desired quality. The print command applied to the digital video tape recorder from the printer 51 enters the system controller 10 via the interface 37.

Figure 15:
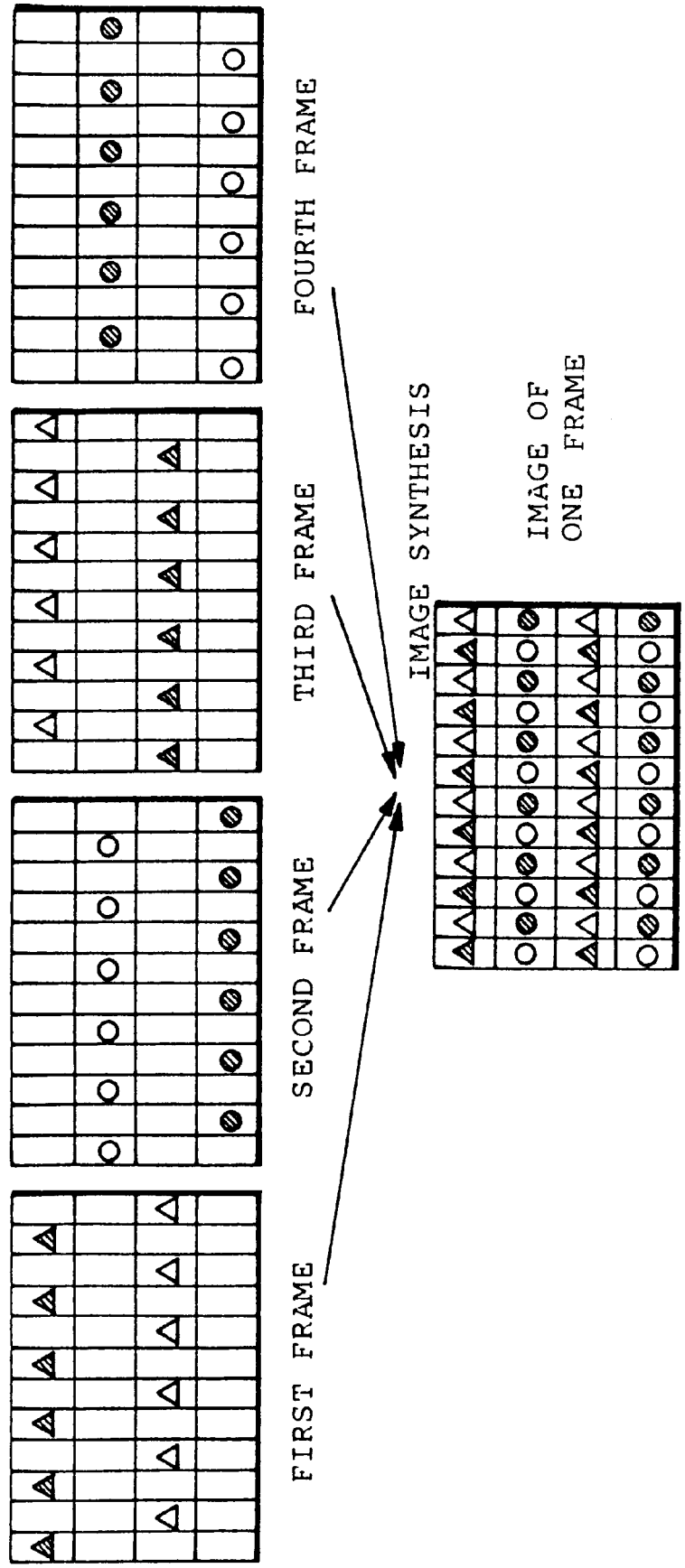
FIG. 15 illustrates processing for generating high-quality image data.

The still-picture identification code that has been recorded in the sub-code area is read and it is determined whether the code is indicative of high-quality still-picture recording (step 85). If the image being displayed on the monitor display unit 52 has been recorded on the magnetic tape 8 by the high-quality still-picture photography mode (YES at step 85), this means that one frame of a high-quality image has been recorded upon being partitioned into four frames. Accordingly, the still-picture playback button 45B is pressed so that image synthesizing processing is executed in the DSP circuit 36 (this is the still-picture playback mode) (step 86). This image synthesizing processing is performed by generating one frame of high-quality image data from four frames of image data, as shown in FIG. 15. If the image being displayed on the monitor display unit 52 has been recorded on the magnetic tape 8 by the ordinary still-picture photography or movie photography mode (NO at step 85), image synthesizing processing is not carried out. The generated high-quality image data, the frame image data obtained by the ordinary still-picture photography mode or the field image data obtained by the movie photography mode is applied to the printer 51, where the data is printed out (step 87). Movie playback is terminated by opening the movie playback switch 45.

Figure 16:
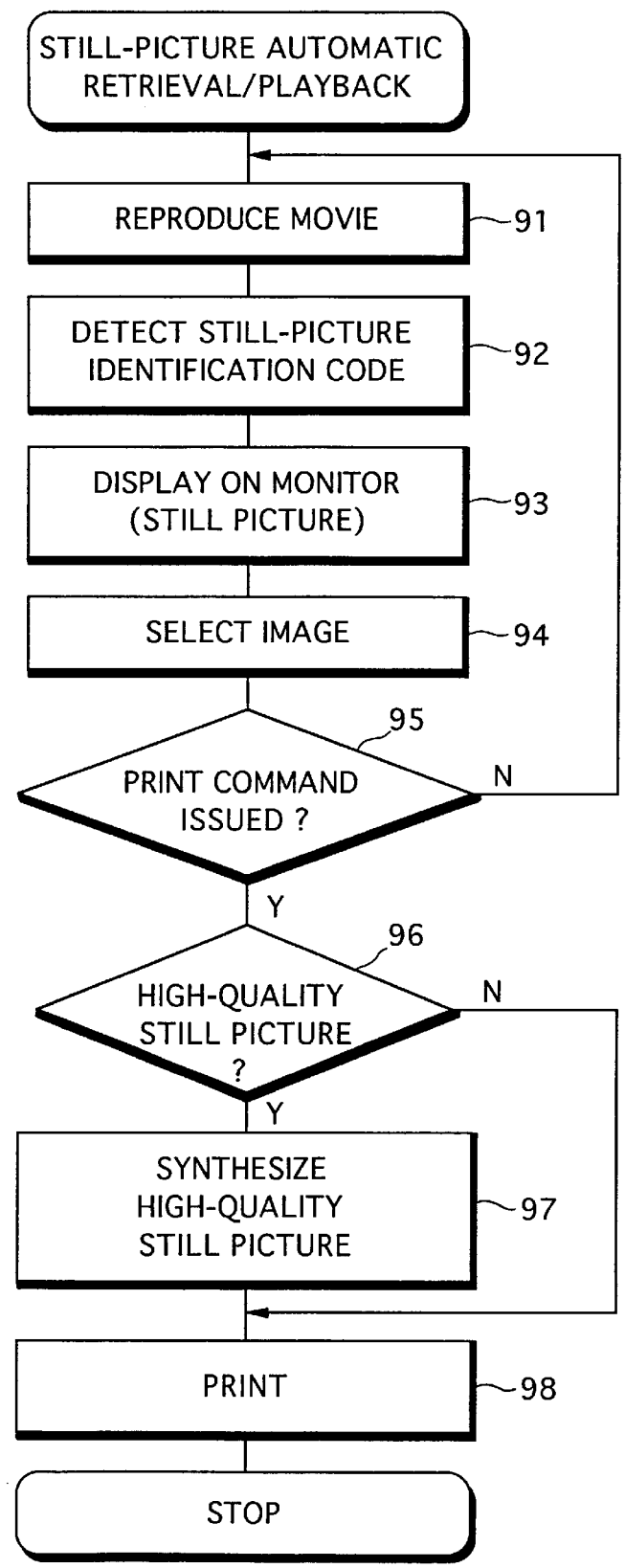
FIG. 16 illustrates processing of a still-picture automatic retrieval and playback mode.

FIG. 16 is a flowchart illustrating the processing procedure executed in the still-picture automatic retrieval playback mode.

According to the still-picture automatic retrieval playback mode, image data that has been recorded on the magnetic tape 8 by high-quality or ordinary still-picture photography is detected, only the image represented by this image data is displayed for a fixed period of time and fast-forward is performed with regard to image data that has been recorded on the magnetic tape 8 by movie photography.

When the desired magnetic tape 8 is placed in the digital video tape recorder and the still-picture automatic playback switch 46 is pressed, movie playback is performed (step 91). In movie playback, a track on which a still-picture identification code has been recorded in the sub-code area is retrieved (step 92). Image data on tracks for which still-picture identification codes have been recorded in the sub-code area are successively applied to the monitor display unit 52 at fixed intervals and the images resulting from still-picture photography are displayed (step 93).

While observing the images successively displayed on the display screen of the monitor display unit 52, the user looks for an image to be printed (step 94). When an image to be printed is found, the temporary-stop button 49 is pressed. In a case where an image being displayed on the monitor display unit 52 has been obtained by the high-quality print-image photography mode, the still-picture playback button 45B is pressed so that processing for generating image data is executed in the DSP circuit 36 in the manner shown in FIG. 15 (this is the still-picture playback mode) (steps 96, 97).

The generated high-quality image data or the frame image data obtained by the ordinary still-picture photography mode is applied to the printer 51, where the image data is printed out (step 98).

It is stated above that processing for synthesizing a high-quality still-picture in the DSP circuit 36 is performed by pressing the still-picture playback button 45B. However, processing for synthesizing a high-quality still-picture may be performed in response to a high-quality still-picture print command from the printer without providing the still-picture playback button 45B.

Figure 18:
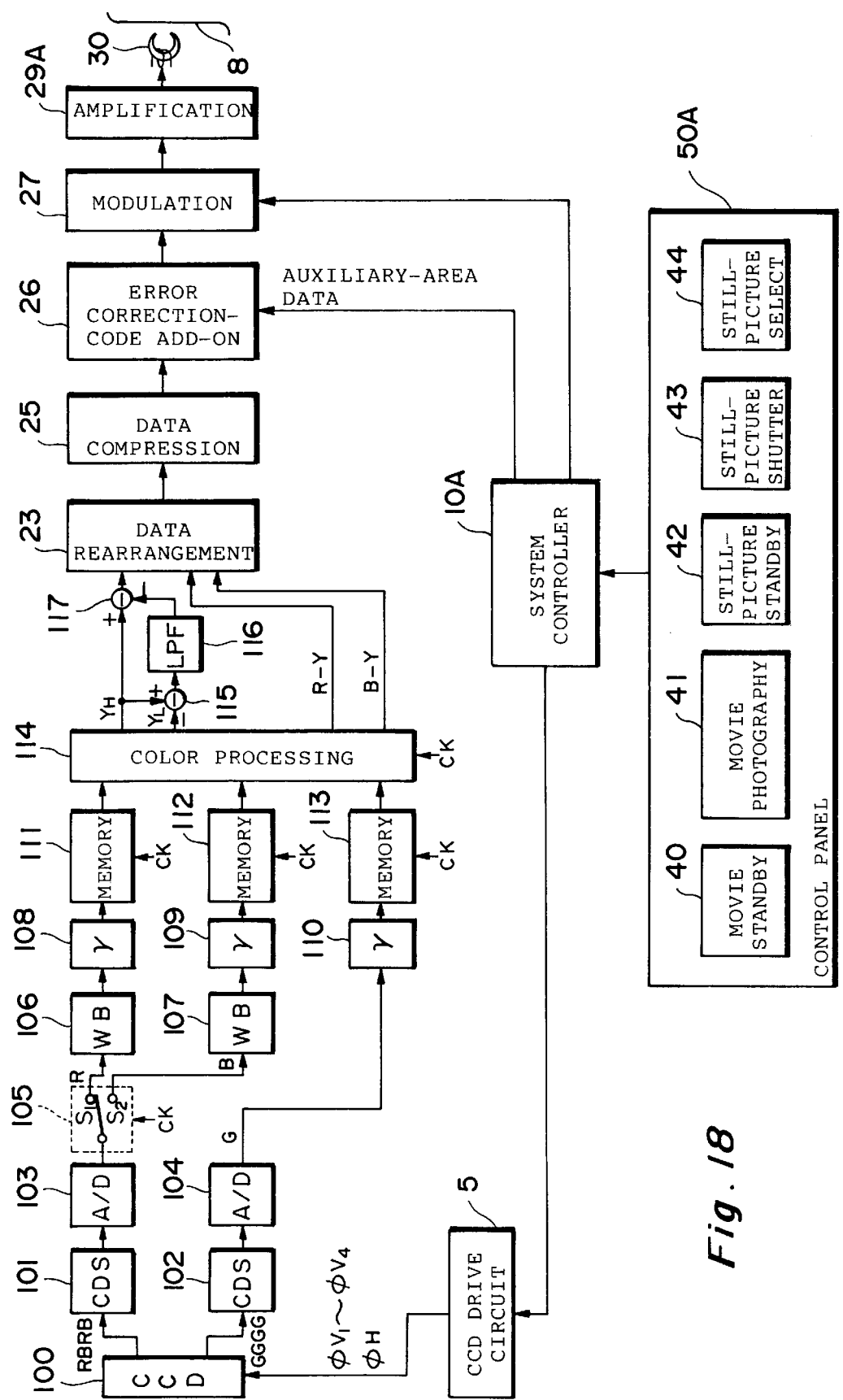
FIG. 18 is a block diagram illustrating the electrical configuration of a digital video tape recorder according to another embodiment of the present invention.

FIG. 18 is a block diagram illustrating the electrical configuration of a digital video tape recorder according to another embodiment of the present invention. Components in FIG. 18 identical with those shown in FIG. 1 are designated by like reference characters and need not be described again.

A CCD 100 used in the image sensing section of the digital video tape recorder is a CCD composed of a large number of pixels. Before describing the overall digital video tape recorder, the structure and operation of the CCD 100 will be discussed.

Figure 19:
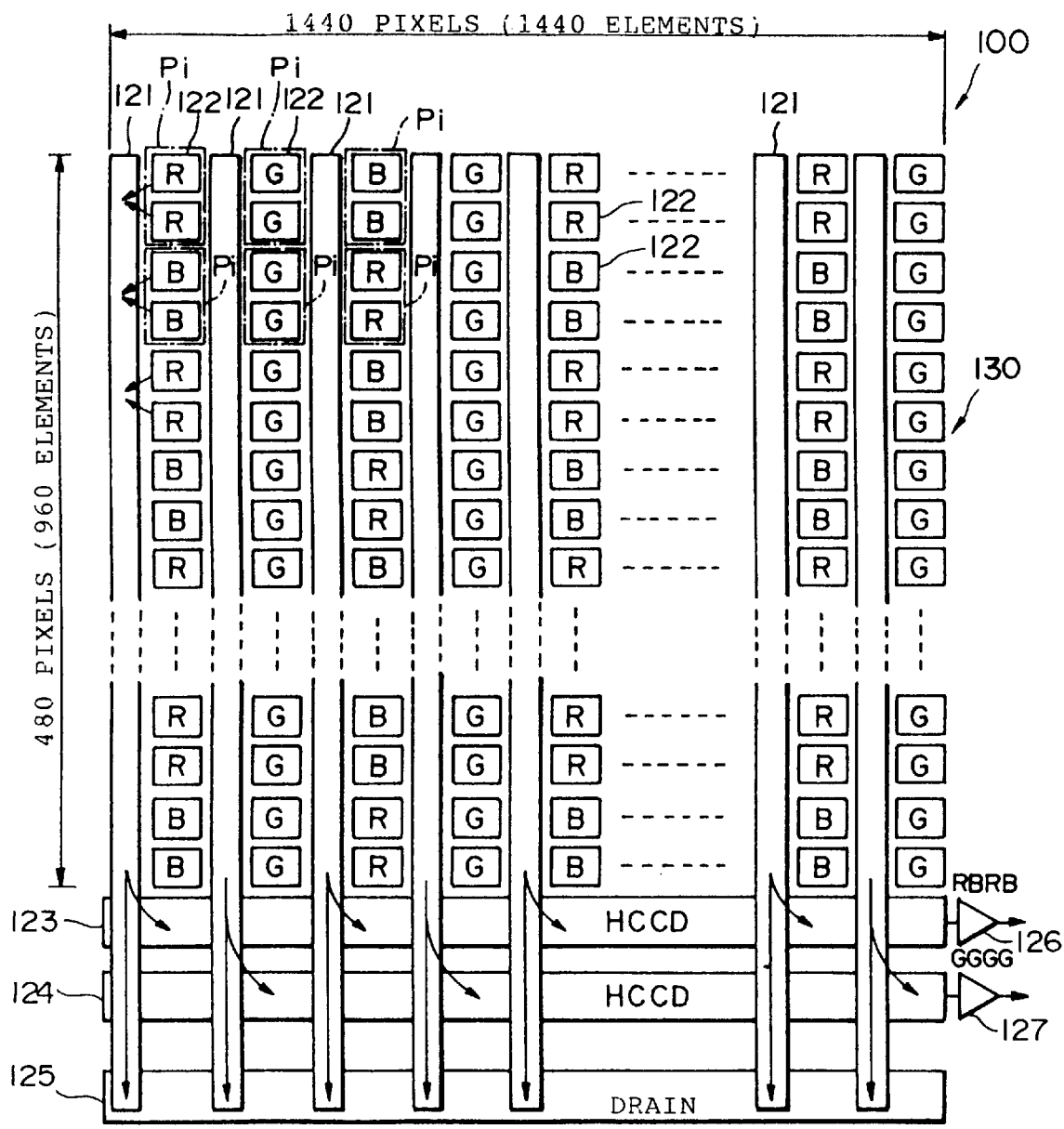
FIG. 19 is a schematic view of a CCD.
Figure 20A:
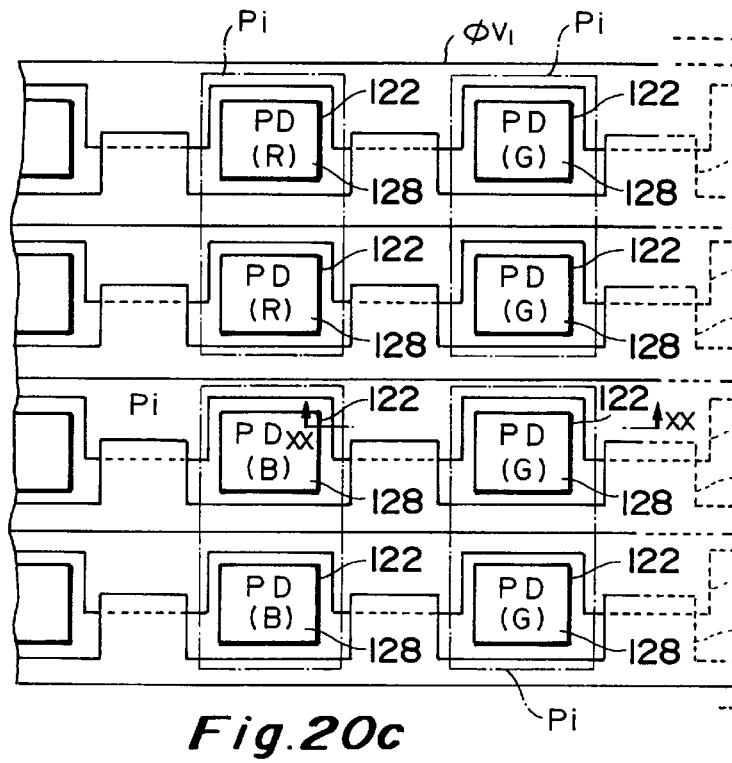
FIG. 20a is a partially enlarged view of the light-receiving area of the CCD.
Figure 20B:
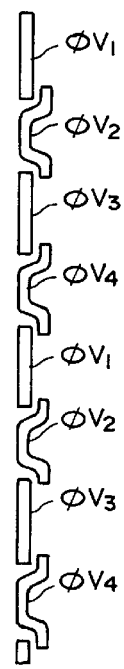
Figure 20C:
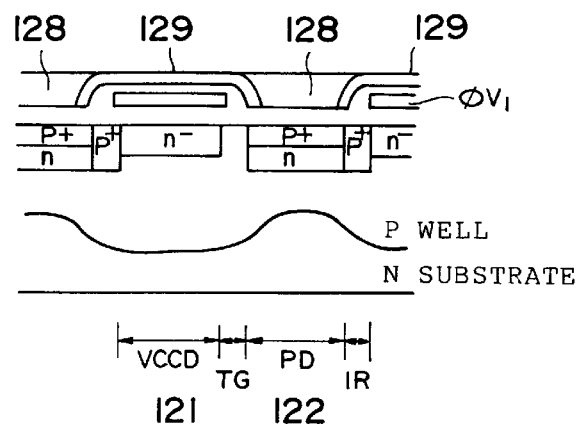

FIG. 19 is a schematic view of the CCD 100, FIG. 20*a* is a partially enlarged view of the light-receiving area of the CCD 100, FIG. 20*b* illustrates vertical transfer electrodes of vertical transfer lines contained in the CCD 100, and FIG. 20*c* is a sectional view taken along line XX—XX of FIG. 20*a*.

As shown in FIG. 19, the CCD 100 includes a light-receiving area 130, a first horizontal transfer line (HCCD) 123, a second horizontal transfer line 124, a drain 125, and floating diffusion amplifiers 126 and 127.

The light-receiving area 130 includes a number of photodiodes 122 arrayed in the horizontal and vertical directions, and vertical transfer lines 121 provided alongside the photodiodes 122 in the vertical direction. Here 1440 photodiodes 122 are provided in the horizontal direction and 960 in the vertical direction. The photodiodes 122 in the odd columns each have a red (R) or a blue (B) color filter provided on the light-receiving surface thereof, with the red and blue color filters alternating every two photodiodes 122. The photodiodes 122 in the even columns each have a green (G) color filter provided on the light-receiving surface thereof. Signal charge accumulates in the photodiodes 122 in conformity with the amount of incident light and the accumulated signal charge is shifted to the vertical transfer lines 121. Of the signal charge that has been shifted from the photodiodes 122 to the vertical transfer lines 121, the signal charge that has accumulated in the photodiodes 122 of the (2n+1)th (where n is a positive integer) row and the signal charge that has accumulated in the photodiodes 122 of the (2n+2)th row mix in the vertical transfer lines 121, as will be described later. Accordingly, though the number of photodiodes contained in the CCD 100 is 1440×960 or approximately 1,400,000, the signal charges that have accumulated in two photodiodes are mixed in the vertical transfer lines 121. Therefore, if the foregoing is calculated in terms of the number of pixels, the number of pixels in the vertical direction is halved, as a result of which the number of pixels is approximately 700,000, or 1440 horizontally and 480 vertically. In FIG. 19, each pixel composed of two photodiodes 122 is designated by Pi.

As shown in FIGS. 20*a* and 20*b*, the vertical transfer lines 121 include transfer electrodes $\phi V_1 \sim \phi V_4$. The four transfer electrodes $\phi V_1 \sim \phi V_4$ neighboring two photodiodes 122 make up one set of transfer electrodes. Signal charge is transferred in the vertical direction by applying transfer pulses $\phi V_1$, φV$_2$, φV$_3$ and φV$_4$ (the transfer pulses are designated by the same characters φV$_1$~φV$_4$ used to designate the transfer electrodes) to the transfer electrodes φV$_1$, φV$_2$, φV$_3$ and φV$_4$ of the vertical transfer lines 121. A light shielding film 129 is provided on the vertical transfer lines 121, and the red, blue or green color filters 128 are provided on the light-receiving surfaces of the photodiodes 122. Provided between each photodiode 122 and adjacent vertical transfer line 121 is a transfer gate TG, which is for shifting the signal charge that has accumulated in the photodiode 122 to the vertical transfer line 121, and an isolation region IR for preventing the occurrence of charge mixing between pixels adjacent to each other in the horizontal direction.

In the CCD 100 illustrated in FIG. 19 and in FIGS. 20*a, b* and *c*, it is possible to perform still-picture (total-pixel) readout, which is suited to the recording of high-quality still pictures, and movie readout suited to the recording of moving pictures. Still-picture readout is a readout method in which all of the signal charge that has accumulated in the photodiodes 122 of the CCD 100 is made the output of the CCD 100. Movie readout is a readout method in which one frame of an image is divided up into images of an odd number of fields and images of an even number of fields, signal charge representing pixels Pi of odd rows [in the CCD 100 shown in FIG. 19, signal charge that has accumulated in the photodiodes 122 of the (4n+1)th (where n is zero or a positive integer) row and in the photodiodes 122 of the (4n+2)th row] is adopted as the output of the CCD 100, and signal charge representing the pixels Pi of even rows [in the CCD 100 shown in FIG. 19, signal charge that has accumulated in the photodiodes 122 of the (4n+3)th row and in the photodiodes 122 of the (4n+4)th row] is adopted as the output of the CCD 100. In movie readout, signal charge that does not become the output of the CCD 100 is swept out. A drain 125 is for the purpose of sweeping out this signal charge.

In the CCD 100 illustrated in FIG. 19 and in FIGS. 20*a, b* and *c*, the CCD includes the first horizontal transfer line 123 and the second horizontal transfer line 124. The first horizontal transfer line 123 transfers the signal charge that has accumulated in the photodiodes 122 of odd columns, namely the R (red) data and the B (blue) data, in the horizontal direction, and the second horizontal transfer line 124 transfers the signal charge that has accumulated in the photodiodes 122 of even columns, namely the G (green) data, in the horizontal direction. The signal charges outputted by first horizontal transfer line 123 and second horizontal transfer line 124 are converted to voltage signals in the floating diffusion amplifiers 126 and 127 and these signals become the outputs of the CCD 100.

The vertical transfer lines 121 which transfer the signal charge that has accumulated in the photodiodes 122 of odd columns are arranged in such a manner that the outputs thereof are applied to the first horizontal transfer line 123 and drain 125. This arrangement can be realized by insulating the second horizontal transfer line 124 and the vertical transfer lines 121. The vertical transfer lines 121 which transfer the signal charge that has accumulated in the photodiodes 122 of even columns are arranged in such a manner that the outputs thereof are applied to the second horizontal transfer line 124 and drain 125. This arrangement can be realized by insulating the first horizontal transfer line 123 and the vertical transfer lines 121.

The mixing of the signal charge that has accumulated in the photodiodes 122 of odd rows and the signal charge that has accumulated in the photodiodes 122 of the even rows will be described with reference to FIGS. 20*a, b, c* and FIG. 21*a*.

When photodiodes 122 are irradiated with light, each photodiode 122 accumulates a signal charge in conformity with the amount of incident light. When signal charge has accumulated in the photodiodes 122, the pulse φV$_2$ is applied to the transfer electrode φV$_2$ as a field shift pulse FS at time $t_{1A}$. As a result, the signal charge that has accumulated in the photodiodes 122 of the (2n+1)th row exceeds the transfer gate TG and is shifted to the vertical transfer lines 121. Next, the pulse φV$_4$ is applied to the transfer electrode φV$_4$ as a field shift pulse FS at time $t_{2A}$. As a result, the signal charge that has accumulated in the photodiodes 122 of the (2n+2)th row exceeds the transfer gate TG and is shifted to the vertical transfer lines 121. Furthermore, the pulse φV$_3$ is applied to the transfer electrode φV$_3$ as a field shift pulse FS at time $t_{3A}$. When this is done, the signal charge beneath the transfer electrode φV$_2$ mixes with the signal charge beneath the transfer electrode φV$_4$. When the pulse φV$_1$ is applied also to the transfer electrode φV$_1$ at time $t_{5A}$, the signal charge accumulates beneath the transfer electrodes φV$_1$ and φV$_2$.

Next, the procedure for transferring the signal charged mixed in the vertical transfer lines 121 will be described with reference to FIGS. 20*a, b, c* and FIG. 21*b*.

If, in a case where signal charge has accumulated beneath the transfer electrodes φV$_1$ and φV$_2$, the transfer pulses φV$_3$, φV$_4$, φV$_1$ and φV$_2$ are applied in the order of the transfer electrodes φV$_3$, φV$_4$, φV$_1$ and φV$_2$ and application of the transfer pulses φV$_3$, φV$_4$, φV$_1$ and φV$_2$ in the order of the transfer electrodes φV$_1$, φV$_2$, φV$_3$ and φV$_4$ is halted, then the signal charge will be transferred in the direction of φV$_1$, φV$_2$, φV$_3$ and φV$_4$, namely downward in FIG. 19. When the transfer pulses φV$_1$~φV$_4$ are applied to one set of transfer electrodes φV$_1$~φV$_4$, as shown in FIG. 21*b*, signal charge is transferred two photodiodes 122 in the vertical direction, i.e., one pixel in the vertical direction.

Figure 23:
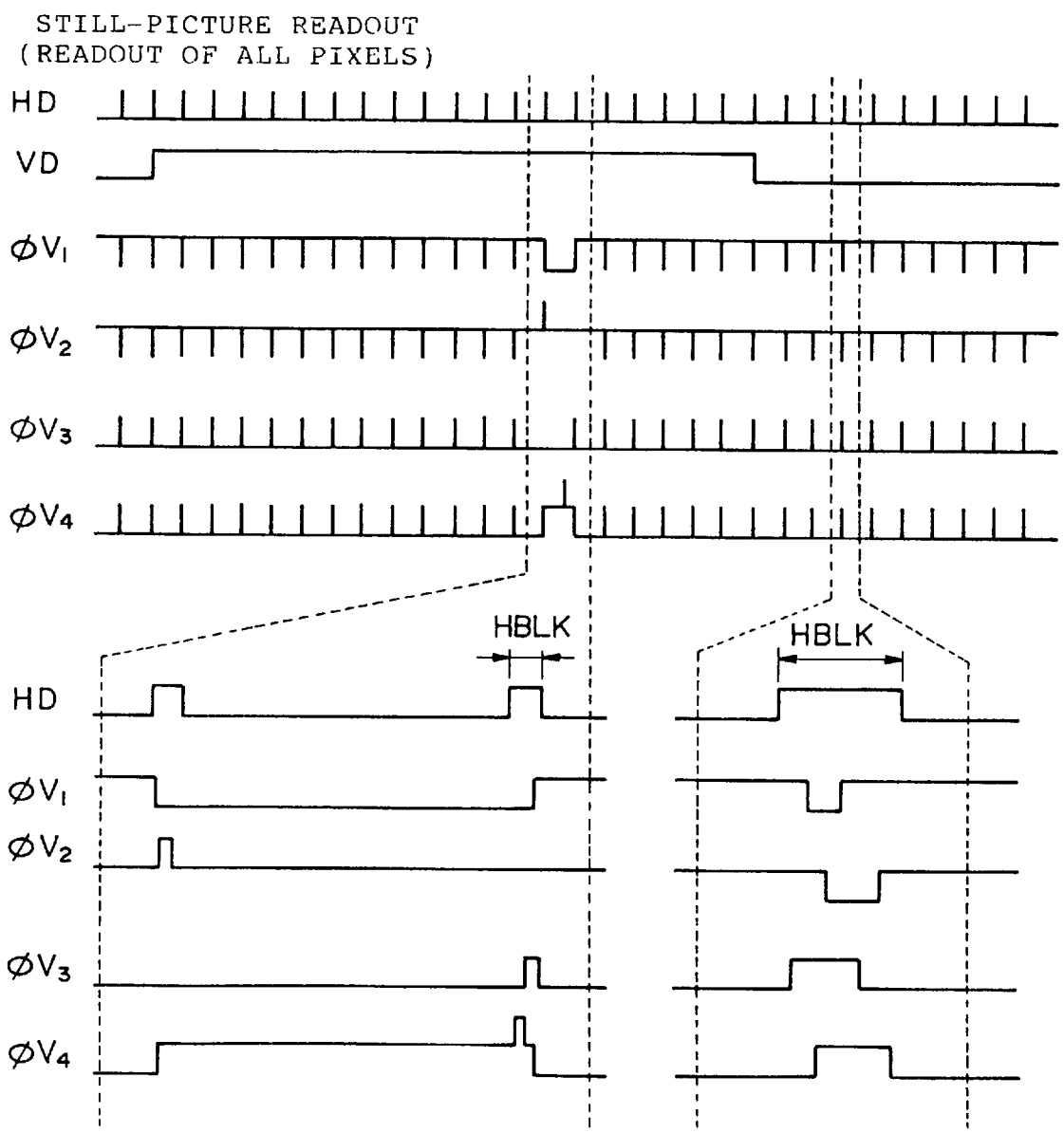
FIG. 23 is a waveform diagram of vertical transfer pulses at the time of still-picture readout.

The operating procedure in the CCD 100 when still-picture readout is performed will now be described. FIG. 22*a* and FIG. 23 illustrate timing charts which prevail at still-picture readout. The timing chart of FIG. 22*a* is illustrated in magnified form in terms of the timing axis in comparison with the timing chart shown in the upper part of FIG. 23. A timing chart magnified in terms of the time axis is illustrated in the lower part of FIG. 23 as well.

In the case of still-picture readout, as shown in FIG. 22*a*, the field shift pulse FS is applied to the transfer electrodes φV$_2$ and φV$_4$ at a period of $\frac{1}{15}$ of a second. More specifically, photography of a subject (accumulation of signal charge) is repeated at the period of $\frac{1}{15}$ of a second. When the field shift pulses FS are applied to the transfer electrodes φV$_2$ and φV$_4$, the signal charge that has accumulated in the photodiodes 122 is shifted to the vertical transfer lines 121 and the signal charge that has accumulated in the photodiodes 122 of the odd rows mixes with the signal charge that has accumulated in the photodiodes 122 of the even rows.

When the signal charges mix, one set of the transfer pulses φV$_1$~φV$_4$ is applied to the transfer electrodes φV$_1$~φV$_4$, as illustrated in FIG. 21*b*. When this is done, the signal charge that has accumulated in the vertical transfer lines migrates vertically downward by one pixel. Accordingly, the signal charge that has accumulated on the lowermost side of the vertical transfer lines in FIG. 19 is outputted from the vertical transfer lines 121. The vertical transfer lines 121 are connected to the horizontal transfer lines 122 and 123 in such a manner that the signal charge that has accumulated in the photodiodes 122 of the odd rows is applied to the first horizontal transfer line 123 and signal charge that has accumulated in the photodiodes 122 of the even rows is applied to the second horizontal transfer line 123. As a result, the signal charge representing the R data and B data is transferred through the first horizontal transfer line and the signal charge representing the G data is transferred through the second horizontal transfer line 124. Transfer of the signal charge in the first horizontal transfer line 123 and second horizontal transfer line 124 ends before the next set of transfer pulses $\phi V_1 \sim \phi V_4$ is applied to the transfer electrodes $\phi V_1 \sim \phi V_4$. In the CCD 100 of the present embodiment, the first horizontal transfer line 123 is used for transfer with regard to the R data and B data in the data of all pixels, and the second horizontal transfer line 124 is used for transfer with regard to the G data. This means that the amount of data transferred in one horizontal transfer line becomes half the amount of data of all pixels. Accordingly, even though the CCD 100 is one having a large number of pixels, transfer of signal charge is possible using comparatively slow horizontal transfer pulses. Application of the vertical transfer pulses $\phi V_1 \sim \phi V_4$ to the vertical transfer electrodes $\phi V_1 \sim \phi V_4$ is repeated in alternation with application of the horizontal transfer pulses to the horizontal transfer lines so that the signal charge of all of the approximately 700,000 pixels is outputted from the CCD 100 upon being divided into the R data and the B and G data.

The operating procedure in the CCD 100 when movie readout is performed will now be described. FIG. 22b illustrates a timing chart which prevails at still-picture readout. When movie readout is performed, readout of image data of even fields is implemented in alternation with readout of image data of odd fields at a period of 1/30 of a second, as shown in FIG. 22b.

Figure 24:
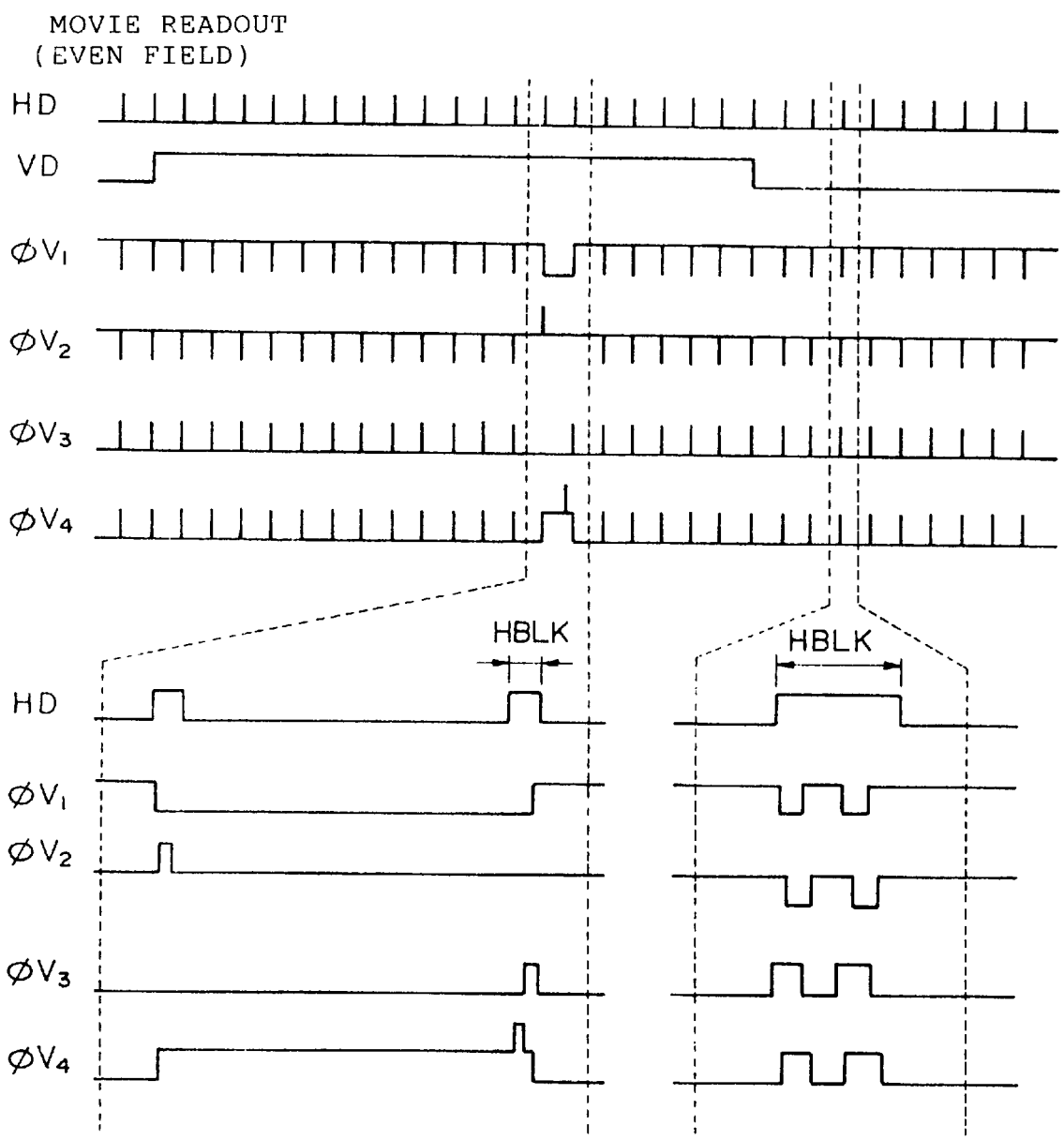
FIG. 24 is a waveform diagram of vertical transfer pulses at the time of movie readout in even-numbered fields.

FIG. 24 shows a timing chart of movie readout in an even field. In case of movie readout, the field shift pulse FS is applied to the transfer electrodes $\phi V_2$ and $\phi V_4$ at a period of 1/30 of a second. More specifically, photography of a subject (accumulation of signal charge) is repeated at the period of 1/30 of a second. When the field shift pulses FS are applied to the transfer electrodes $\phi V_2$ and $\phi V_4$ and mixing of signal charge takes place in the vertical transfer lines 121, one set of the transfer pulses $\phi V_1 \sim \phi V_4$ shown in FIG. 21b is applied to the transfer electrodes $\phi V_1 \sim \phi V_4$ twice during a horizontal blanking interval HBLK (see the lower right part of FIG. 24). Accordingly, the signal charge that has accumulated in the vertical transfer lines 121 migrates vertically downward by two pixels. Accordingly, the signal charge that has accumulated on the lowermost side of the vertical transfer lines in FIG. 19 is applied to the drain 125 through the horizontal transfer line 123 or 124. The signal charge that has been applied to the drain 125 is swept out from the drain 125. Further, of the signal charge that has been accumulated in correspondence with the pixels which are second from the bottom in FIG. 19, the signal charge that has accumulated in the photodiodes 122 of the odd columns is applied to the first horizontal transfer line 123 and the signal charge that has accumulated in the photodiodes 122 of the even columns is applied to the second horizontal transfer line 124. The signal charge that has been applied to the first horizontal transfer line and second horizontal transfer line is outputted upon being transferred through the horizontal transfer lines 123 and 124.

In movie readout thus performed, the vertical transfer pulses $\phi V_1 \sim \phi V_4$ are applied to the vertical transfer electrodes $\phi V_1 \sim \phi V_4$ in such a manner that the signal charge is fed two pixels in the vertical direction within the horizontal blanking interval HBLK. In even fields, therefore, signal charge that has been accumulated in the photodiodes 122 corresponding to the pixels of the even rows is applied to the drain 125, and signal charge that has been accumulated in the photodiodes 122 corresponding to the pixels of the odd rows is applied to the horizontal transfer line 123 or 124. Accordingly, in the even fields at movie readout, only the signal charge that has been accumulated in the photodiodes 122 corresponding to the pixels of the odd rows becomes the output of the CCD 100.

Figure 25:
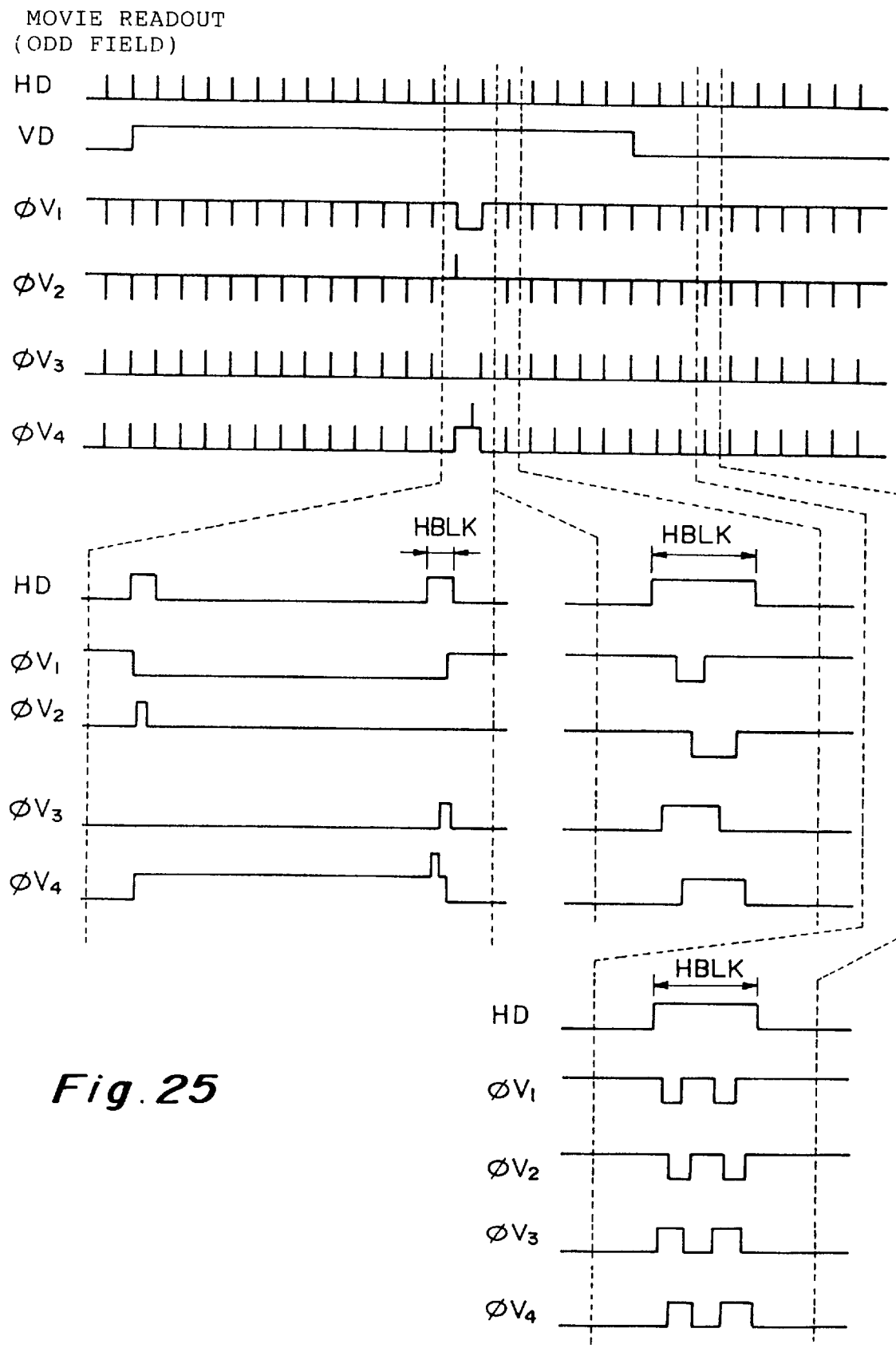
FIG. 25 is a waveform diagram of vertical transfer pulses at the time of movie readout in an odd-numbered field.

FIG. 25 shows a timing chart of movie readout in an odd field.

As shown in FIG. 22b and FIG. 25, the set of vertical transfer pulses $\phi V_1 \sim \phi V_4$ applied to the vertical transfer electrodes $\phi V_1 \sim \phi V_4$ immediately after field shift pulses FS have been applied to the vertical transfer electrodes $\phi V_1 \sim \phi V_4$ in an odd field is a single set in the horizontal blanking interval. Accordingly, the signal charge that has accumulated in the lowermost rank of the vertical transfer lines 121 in FIG. 20 is not applied to the drain 125 but is applied to the horizontal transfer line 123 or 124. After the vertical transfer pulses $\phi V_1 \sim \phi V_4$ have been applied to the vertical transfer electrodes $\phi V_1 \sim \phi V_4$ immediately following the application of the field shift pulses FS, one set of the vertical transfer pulses $\phi V_1 \sim \phi V_4$ shown in FIG. 21b is applied to the vertical transfer electrodes $\phi V_1 \sim \phi V_4$ twice in the horizontal blanking interval HBLK. Accordingly, in the odd field, the signal charge that has been accumulated in photodiodes 122 corresponding to the pixels of the odd rows is applied to the drain 125, and the signal charge that has been accumulated in photodiodes 122 corresponding to the pixels of the even rows is applied to the horizontal transfer line 123 or 124. As a consequence, in the odd field at movie readout, only the signal charge that has been accumulated in the photodiodes 122 corresponding to the pixels of the even rows becomes the output of the CCD 100.

In movie readout, the pixels read out vary alternately between those of odd rows and those of even rows in the odd fields and even fields. Accordingly, interlaced readout is achieved.

The CCD 100 used in the image sensing section of this digital video tape recorder has approximately 700,000 pixels, namely 1440 pixels in the horizontal direction and 480 pixels in the vertical direction, and thus the amount of image data obtained is twice that of a 350,000-pixel CCD at the time of still-picture readout. The amount of data in one frame of image data obtained from such a 700,000-pixel CCD 100 corresponds to the amount of data in two frames of image data, i.e., four fields of image data, in a 350,000-pixel CCD.

In the digital video tape recorder of this embodiment, one frame of image data obtained from the CCD 100 at still-picture readout is divided into four fields of image data, two of the fields are recorded on the magnetic tape 8 using 100 tracks and the other two fields are recorded on the magnetic tape 8 using 100 tracks. As a result, it is possible to record image data in line with the existing recording standard of digital video tape recorders while high-quality photography is achieved.

Figure 26:
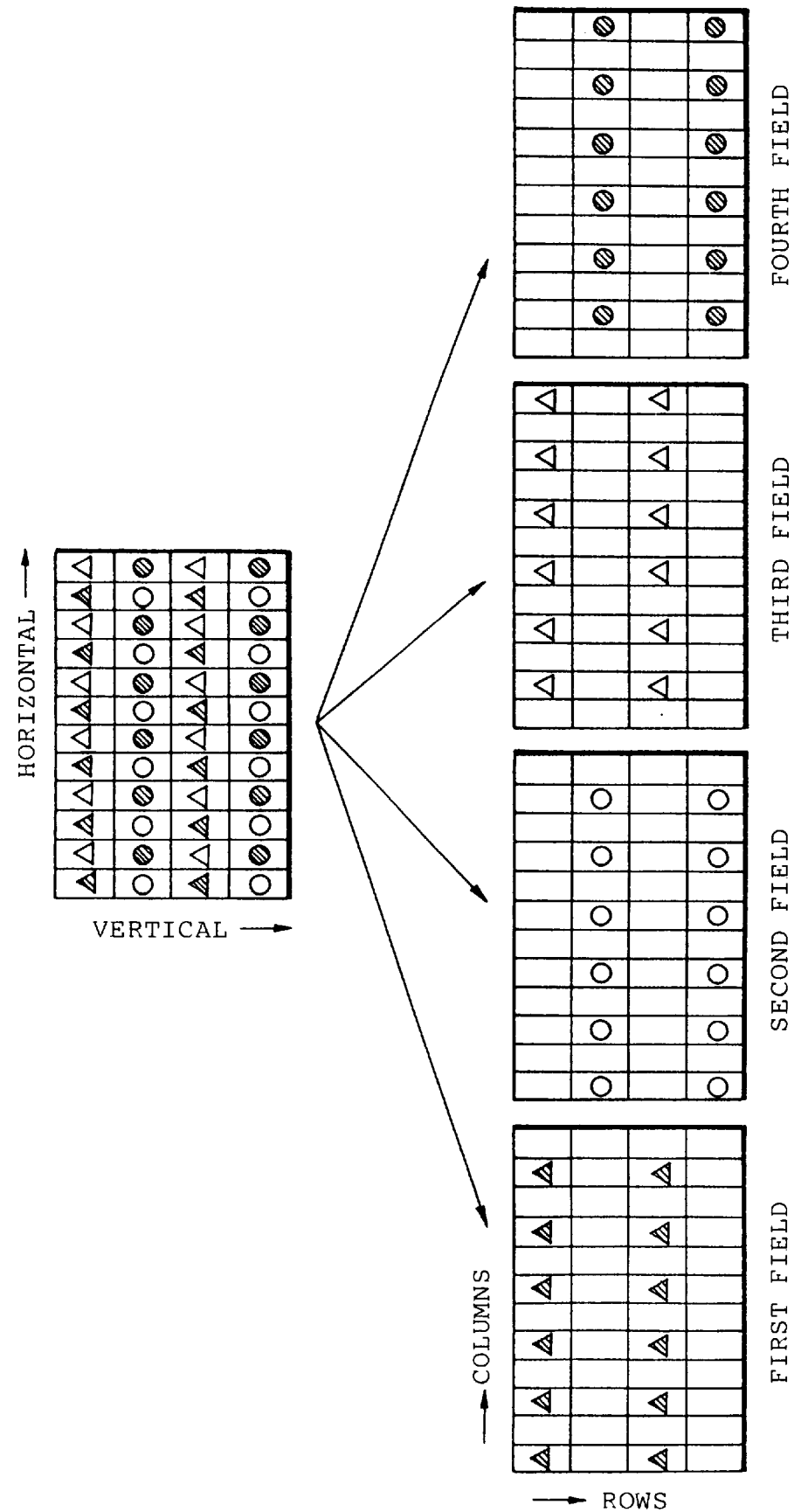
FIG. 26 illustrates a method of partitioning an image.

FIG. 26 illustrates a method of partitioning image data into four fields. This partitioning method is substantially the same as the method, which is illustrated in FIG. 8, of partitioning one picture of image data into four frames in such a manner that each constructs one picture frame, except for the following points. Since the CCD 100 is composed of about 700,000 pixels, the number of pixels of the CCD 100 is twice that of the approximately 350,000 pixels used conventionally. Consequently, unlike the partitioning method of FIG. 8, the partitioning method shown in FIG. 26 effects partitioning into four fields rather than four frames. Further, the image data is partitioned in such a manner that one frame is composed of a first field and a second field and one frame is composed of a third field and a fourth field. Each of these frames is suited to interlaced scanning. Accordingly, in playback of a moving picture, playback and display based upon ordinary interlaced scanning used heretofore are possible. The luminance data of the first field is composed of luminance data in odd rows and odd columns. The luminance data of the second field is composed of luminance data in even rows and odd columns. The luminance data of the third field is composed of luminance data in odd rows and even columns. The luminance data of the fourth field is composed of luminance data in even rows and even columns.

Of course, partitioning into four fields is possible in exactly the same way as shown in FIG. 8. For example, the luminance data of the first field is composed of luminance data in odd rows and in odd and even columns repeated alternately in the vertical direction.

The overall operation of the digital video tape recorder is supervised by a system controller 10A, as shown in FIG. 18.

The digital video tape recorder includes a control panel 50A. Setting signals from various switches on the control panel 50A are applied to the system controller 10A. As a result, control conforming to the settings made on the control panel 50A is performed by the system controller 10A.

The digital video tape recorder includes a CCD drive circuit 5 from which the vertical transfer pulses $\phi V_1 \sim \phi V_4$ and a horizontal transfer pulse $\phi H$ are applied to the CCD 100, whereby the CCD 100 is driven, in response to the mode setting made on the control panel 50A, in such a manner that still-picture readout or movie readout is performed.

The R signal and B signal contained in the video signal from the CCD 100 and outputted alternately by the first horizontal transfer line 123 are applied to CDS (correlated double sampling) circuit 101, and the G signal contained in the video signal is applied to a CDS circuit 102. The CDS circuit 101 removes kTC noise from the R and B signals, which are then converted to digital image data in an analog/digital converter circuit 103. The digital image data is applied to a changeover switch 105. The latter switches between an $S_1$ terminal and a $S_2$ terminal depending on a clock pulse provided by a clock pulse generating circuit (not shown). The switch 105 makes the connection to the $S_1$ side when the R signal enters and to the $S_2$ side when the B signal enters. The serial R data and B data is converted to parallel R data and B data by the changeover switch 105, and the parallel R and B data is applied to white-balance adjustment circuits 106 and 107, respectively. The white-balance circuits 106 and 107 apply a white-balance adjustment and apply the adjusted R and B data to gamma-correction circuits 108 and 109, respectively. The CDS circuit 102 removes kTC noise from the G signal, after which the G signal is converted to digital G data in an analog/digital circuit 104. The digital G data is applied to gamma-correction circuit 110.

A gamma correction is applied to the R data, B data and G data in the gamma-correction circuits 108, 109 and 110, respectively, after which the corrected data is applied to memories 111, 112 and 113. Since the R data and B data contains half the amount of data in the G data, the memory capacity of each of the memories 111 and 112 need only be half that of the memory 113. For example, whereas the memory capacity of each of the memories 111 and 112 is 175 KB, the memory capacity of the memory 113 is 350 KB. Clock pulses from a clock pulse generating circuit (not shown) applied to the memories 111, 112 and 113, as well, and the input R, B and G data is stored in the memories 111, 112 and 113, respectively. The R, B and G image data represented in conformity with the delta array of the CCD 100 as shown in FIG. 27 is divided solely into items of R, B and G data, as illustrated in FIGS. 28a, b and c, and the image data is stored in the memories 111, 112 and 113 in such a manner that the data of pixels in identical rows in the CCD becomes the data of identical rows in the memories 111, 112 and 113.

The R, G and B image data that has been stored in the memories 111, 112 and 113 is read out of the respective memories 111, 112 and 113 and applied to a color processing circuit 114. The latter generates and outputs luminance data $Y_H$ of high-frequency components, luminance data $Y_L$ of low-frequency components as well as R-Y and B-Y color-difference data from the input R, B and G data. In the digital video tape recorder, the high-quality image of one frame shown in the upper part of FIG. 26 is partitioned into four field images and recorded on the magnetic tape 8. Accordingly, the luminance data $Y_H$ of high-frequency components, the luminance data $Y_L$ of low-frequency components as well as the R-Y and B-Y color-difference data are generated and outputted so as to be partitioned into four fields of data in the color processing circuit 114 as well. The processing executed by the color processing circuit 114 to generate the luminance data $Y_H$ and $Y_L$ as well as the R-Y and B-Y color-difference data will be described in detail later.

The wide-band luminance data containing high-frequency components generated in the color processing circuit 114 is applied to subtractor circuits 117 and 115. The luminance data containing the low-frequency components is applied to a subtractor circuit 115. The subtractor circuit 115 performs the operation $Y_H - Y_L$, i.e., subtracts the luminance data $Y_L$ of low-frequency components from the wide-band data $Y_H$ containing high-frequency components, and applies the output luminance data to a low-pass filter 116, where the high-frequency components are eliminated. The luminance data [LPF $(Y_H - Y_L)$] from which the high-frequency components have been removed in the low-pass filter 116 is applied to the subtractor circuit 117. The latter performs the operation $Y_H - \text{LPF}(Y_H - Y_L)$, i.e., subtracts the output luminance data of low-pass filter 116 from the luminance data $Y_H$ containing the high-frequency components. As a result, the luminance data composed of the luminance data $Y_H$ of high-frequency components and the luminance data $Y_L$ of low-frequency components from the subtractor circuit 117 is applied to the data rearrangement circuit 23. The color-difference data R-Y and B-Y outputted by the color processing circuit 114 also is applied to the rearrangement circuit 23.

The image data composed of the luminance data and R-Y, B-Y color-difference data is recorded on the magnetic tape 8 by the magnetic head 30 after being acted upon by the data compression circuit 25, error correction-code add-on circuit 26 and modulator circuit 27.

The first two fields of image data in one frame of image data, namely in the four fields of image data, obtained using the 700,000-pixel CCD 100 corresponds to the amount of data in one frame of image data obtained by photographing a subject using the 350,000-pixel CCD employed normally. Accordingly, this data is recorded in the video recording area $A_2$ on 100 consecutive tracks thereof. The remaining two fields of image data in the four fields of image data are recorded in the video recording area $A_2$ on 100 tracks that follow the image data of the initial two frames of image data already recorded. Since one frame of image data obtained using the 700,000-pixel CCD 100 has twice as much data as one frame of image data obtained using the 350,000-pixel CCD employed normally, this data is recorded on the magnetic tape 8 using 20 tracks. The operation for recording the four fields is performed at a period of ¹⁄₁₅ of a second in the same manner that four fields of photography is carried out.

Described next will be the processing executed by the color processing circuit 114 to generate the luminance data $Y_H$ containing the high-frequency components, the luminance data $Y_L$ containing the low-frequency components, as well as the R-Y and B-Y color-difference data.

FIG. 29 illustrates a procedure through which the wide-band luminance data $Y_H$ containing the high-frequency components is generated from the R, B and G data provided by the memories 111, 112 and 113, respectively. This procedure generates the high-frequency wide-band luminance data $Y_H$ representing four fields of an image from one frame of a high-quality image. In the subscript (x,y) of R(x,y), B(x,y) or G(x,y) in FIG. 28, x stands for the position of the pixel in the column direction and y the position of the pixel in the row direction. The image represented by the data of the first field in FIG. 28, the image represented by the data of the second field, the image represented by the data of the third field and the image represented by the image data of the fourth field correspond to the image of the first field, the image of the second field, the image of the third field and the image of the fourth field, respectively, partitioned into four fields from the single frame of the high-quality image.

In the case where the first field of the wide-band luminance data $Y_H$ containing high-frequency components is generated in FIG. 29, the data of the arithmetic mean of the R data and G data is used alternatively with the data of the arithmetic mean of the B data and G data in the column direction, with the R data, B data and G data existing at the positions of the corresponding columns and rows in FIGS. 28*a*, *b*, and *c*. In the case where the second field of the wide-band luminance data $Y_H$ containing high-frequency components is generated, the data of the arithmetic mean of the R data and G data is used in alternatively with the data of the arithmetic mean of the B data and G data as in the manner of the first field. However, the order of appearance of the data of the arithmetic mean of the R data and G data and the data of the arithmetic mean of the B data and G data is the reverse of that in the case of the first field.

In the third field and fourth field, there is a shift of one pixel in the column direction in comparison with the first and second fields. In the case where the third field of the wide-band luminance data $Y_H$ containing high-frequency components is generated, the data of the arithmetic mean of the R data and G data is used alternatively with the data of the arithmetic mean of the B data and G data in the column direction, with the R data, B data and G data existing at the positions of the corresponding columns and rows in FIGS. 28*a*, *b*, and *c*. In the case where the fourth field of the wide-band luminance data $Y_H$ containing high-frequency components is generated, the data of the arithmetic mean of the R data and G data is used alternatively with the data of the arithmetic mean of the B data and G data as in the manner of the third field. However, the order of appearance of the data of the arithmetic mean of the R data and G data and the data of the arithmetic mean of the B data and G data is the reverse of that in the case of the third field.

In a case where the luminance data $Y_L$ of the low-frequency components is generated, first the low-frequency component data $R_L$, $G_L$ and $B_L$ of the three primary colors is generated. FIG. 30 illustrates a procedure for generating the low-frequency component data $R_L$, $G_L$ and $B_L$ of the three primary colors. In FIG. 30 also, in a manner similar to that of FIG. 29, the image represented by the data of the first field, the image represented by the data of the second field, the image represented by the data of the third field and the image represented by the image data of the fourth field correspond to the image of the first field, the image of the second field, the image of the third field and the image of the fourth field, respectively, partitioned into four fields from the single frame of the high-quality image. In the subscript (x,y) of R(x,y), B(x,y) or G(x,y) in FIG. 29, x stands for the position of the pixel in the column direction and y the position of the pixel in the row direction.

Assume a case in which the first field of the low-frequency component data $R_L$, $G_L$ and $B_L$ of the three primary colors is generated in FIG. 30. With regard to the $R_L$ data, in which the items of data are mutually adjacent in the column direction in FIGS. 28*a*, *b* and *c*, the item of R data appearing first and the item of R data appearing next are multiplied by coefficients having a ratio of 3:1, and the products are summed. With regard to the $G_L$ data, in which the items of data are adjacent to three pixels in the column direction in FIGS. 28*a*, *b* and *c*, the central item of G data and the items of G data at both ends are multiplied by coefficients having a ratio of 2:1, and the products are summed. With regard to the $B_L$ data, in which the items of data are mutually adjacent in the column direction in FIGS. 28*a*, *b* and *c*, the item of R data appearing first and the item of R data appearing next are multiplied by coefficients having a ratio of 3:1, and the products are summed. In a case in which the second field of the low-frequency component data $R_L$, $G_L$ and $B_L$ of the three primary colors is generated, for the $G_L$ data the data is generated in the same manner as in the case of the first field. With regard to the $R_L$ data and $B_L$ data, the processing for generating the $R_L$ data and the processing for generating the $B_L$ data is the opposite of that for the first field.

In the third and fourth fields, there is a shift of one pixel in the column direction in comparison with the first and second fields. The processing for generating the $R_L$ data, $G_L$ data and $B_L$ data of the third field is similar to the processing for generating the $R_L$ data, $G_L$ data and $B_L$ data of the second field, and the processing for generating the $R_L$ data, $G_L$ data and $B_L$ data of the fourth field is similar to the processing for generating the $R_L$ data, $G_L$ data and $B_L$ data of the first field. Hence, no further description is necessary.

When the $R_L$ data, $G_L$ data and $B_L$ data is generated for each of the first, second, third and fourth fields, the luminance data $Y_L$ of the low-frequency components is generated, for each of the first, second, third and fourth fields, from the $R_L$ data, $G_L$ data and $B_L$ data in accordance with the following equation:

$$Y_L = 0.30 R_L + 0.59 G_L + 0.11 B_L \qquad \text{Eq. (1)}$$

The R-Y color-difference data and B-Y color-difference data is generated, for each of the first, second, third and fourth fields, from the $R_L$ data, $G_L$ data and $B_L$ data in accordance with the following equations:

$$R\text{-}Y = R_L - Y_L \qquad \text{Eq. (2)}$$

$$B\text{-}Y = B_L - Y_L \qquad \text{Eq. (3)}$$

Luminance data is generated from the luminance data $Y_L$ of low-frequency components and the wide-band luminance data $Y_H$ of high-frequency components thus generated, and the luminance data is applied to the data compression circuit 38, along with the color-difference data R-Y and B-Y obtained from Equations (2) and (3), where these items of data are subjected to data compression in the manner described above.

The foregoing description relates to a case where all pixels are read out of the CCD 100. However, in a case where the CCD 100 undergoes movie readout, it will suffice to switch alternately between the above-described processing of the first field and the processing of the second field depending upon odd and even fields.

In the foregoing embodiment, the subject is photographed at a period of 1/15 of a second in case of still-picture readout. In the case of movie readout, the subject is photographed alternately in even and odd fields every 1/30 of a second. However, these photographic periods do not impose a limitation, for photography of the subject may be performed at a period of 1/30 of a second even in case of still-picture readout, for example, and the subject may be photographed alternately in even and odd fields every 1/60 of a second even in case of movie readout.

Figure 31:
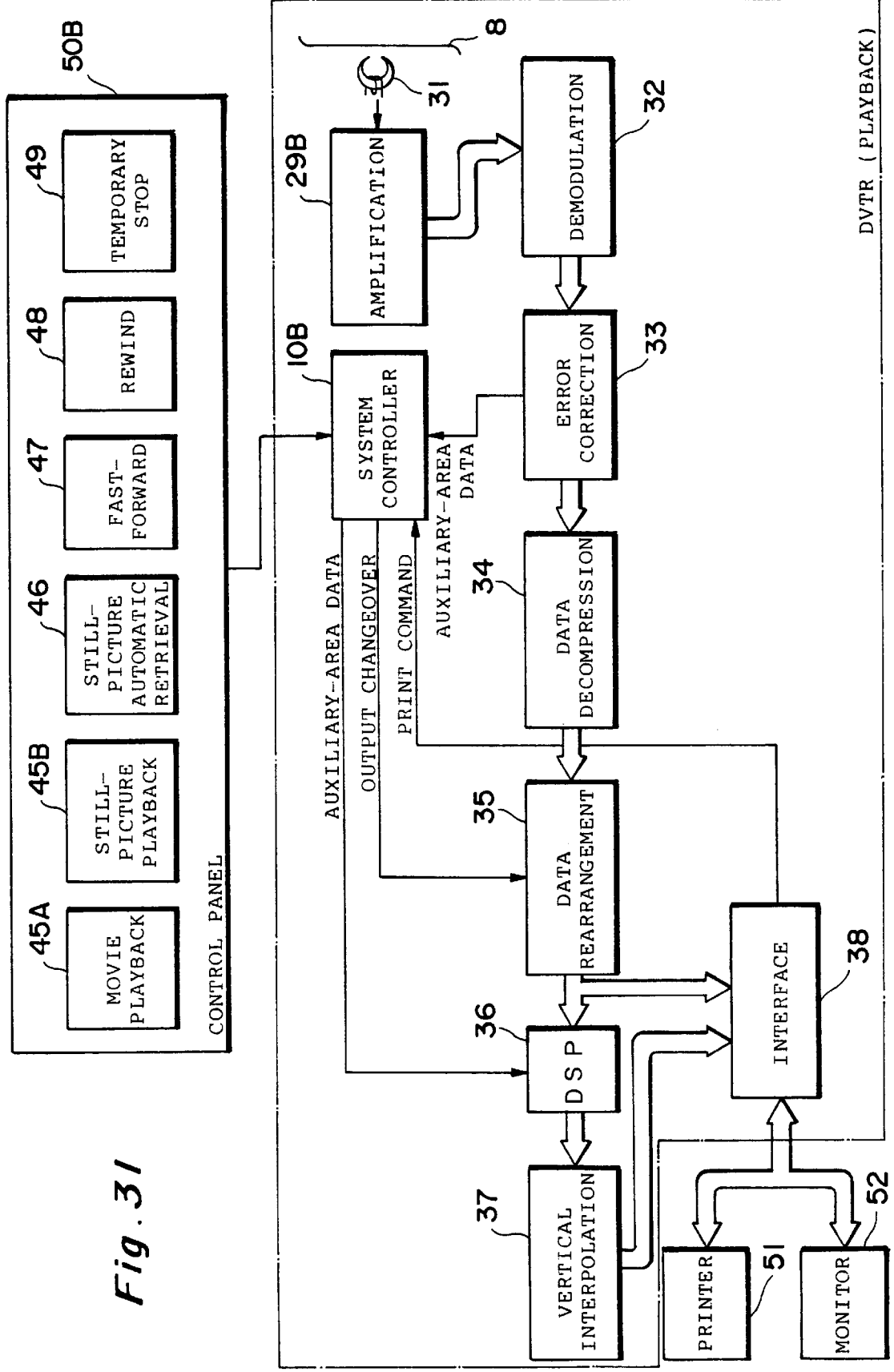
FIG. 31 is a block diagram showing the electrical configuration of the playback system of a digital video tape recorder.

FIG. 31 is a block diagram showing the electrical configuration of the playback system of a digital video tape recorder. The circuitry of the playback system shown in FIG. 31 can be constructed separately or incorporated in the circuitry of the recording system shown in FIG. 1. Components in FIG. 31 identical with those shown in FIG. 1 are designated by like reference characters and need not be described again.

Setting signals from various switches on a control panel 50B provided on the digital video tape recorder of FIG. 31 are applied to a system controller 10B.

In the mode for playing back digital image data, the image data, recording-area data and other data recorded on the magnetic tape 8 is read by the magnetic head 31 is applied to a playback amplifier circuit 29B. In the data amplified by the playback amplifier circuit 29B, the image data is applied to the rearrangement circuit 35 after being acted upon by the demodulator circuit 32, error correction-code add-on circuit 33 and data compression circuit 34. The auxiliary-area data is applied to the system controller 10B.

In the movie playback mode, the digital image data outputted by the data rearrangement circuit 35 is applied to the monitor display unit 55 one field at a time. Interlaced scanning is performed in odd and even fields by the monitor display unit 52 and a moving picture is reproduced on the monitor display unit 52. More specifically, in the lower part of FIG. 32, one frame is composed of first and second fields and one frame is composed of third and fourth fields. The monitor display unit 52 may be provided on the digital video tape recorder.

The digital video tape recorder illustrated in FIG. 31 is capable of still-picture playback in addition to movie playback. Still-picture playback is carried out when a desired still picture is retrieved during movie playback, as shown in FIG. 12, and in a case where a still picture retrieved during playback in the still-picture automatic retrieval mode is reproduced, as shown in FIG. 14. In the still-picture playback mode, data is decompressed in the data decompression circuit 34 and the decompressed data is applied to the DSP circuit 36. Four fields of data which construct one frame are identified in the DSP circuit 36 based upon the recording-area data that has been applied to the system controller 10B, and the DSP circuit 36 generates one frame of image data from the four fields of data identified.

The single frame of image data generated in the DSP circuit 36 is applied to a vertical interpolation circuit 37.

The CCD 100 used in the image sensing section of the digital video tape recorder shown in FIG. 18 has a large number of pixels, namely 1400 pixels, in the horizontal direction, but only 480 pixels in the vertical direction. Thus the number of pixels in the vertical direction is not much different from the number of pixels in the vertical direction of the CCD having the usual number of pixels (350,000). Processing for interpolating the data of pixels in the vertical direction is executed in order to raise the resolution in the vertical direction. This interpolation processing is executed by the vertical interpolation circuit 37.

The image data that has undergone vertical interpolation processing in the vertical interpolation circuit 37 is applied to the printer 51 via an interface 38, as a result of which a high-quality still picture is printed out. It should be noted that the vertical interpolation processing circuit 37 may be provided in the printer 51.

It is of course possible to apply the image data to the printer 51 without subjecting it to vertical interpolation processing. The image data (interpolated or not interpolated) may be applied to the monitor display unit 52 to display a high-quality still picture.

The vertical interpolation processing in the vertical interpolation circuit 37 is carried out as set forth below.

Figure 33:
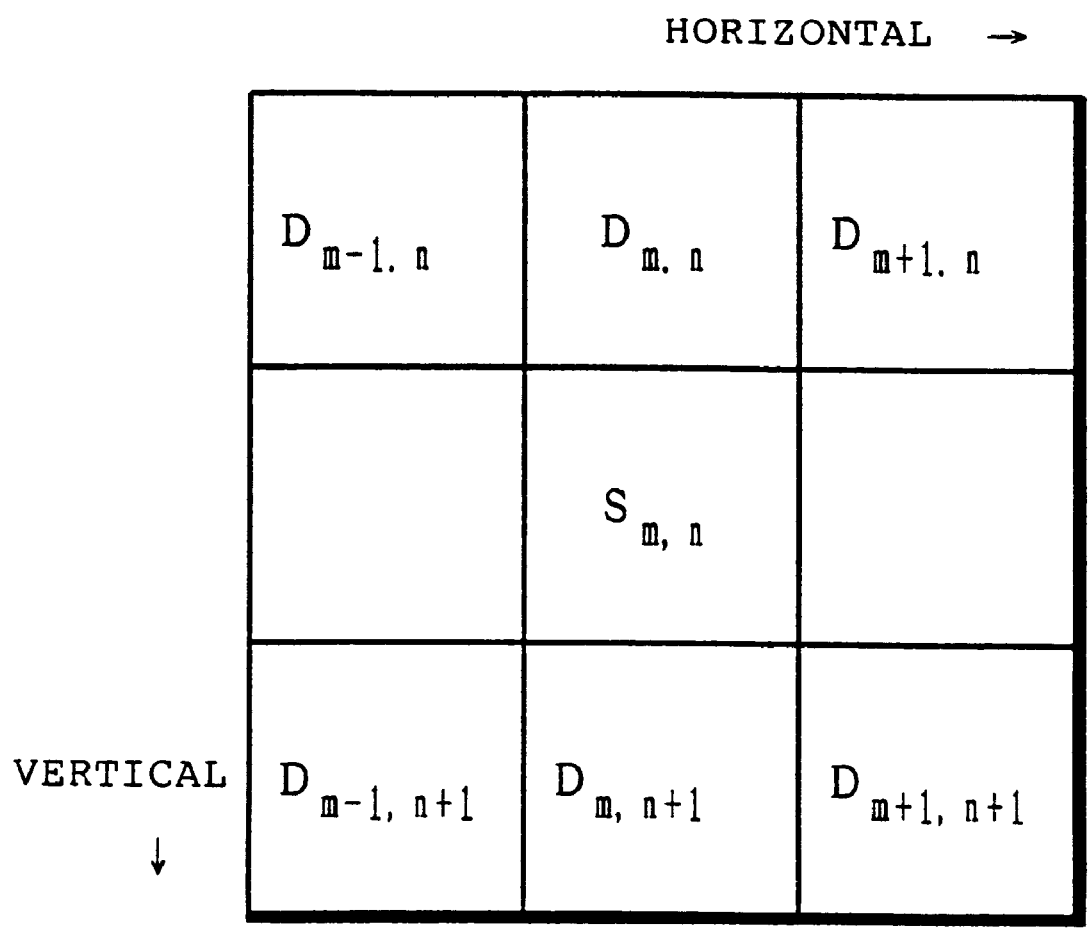
FIG. 33 is a diagram, which illustrates an example of a pixel array, for describing vertical interpolation.

FIG. 33 illustrates part of a pixel array. A central pixel $S_{m,n}$ is a pixel for which the image data is to be generated by interpolation. In a case where the image data $S_{m,n}$ of the pixel to be interpolated is calculated (where the image data will hereinafter be denoted by the same symbols used for the pixel), the interpolation circuit 37 calculates the difference $\Delta_1 = |D_{m,n+1} - D_{m,n}|$ between the image data of pixel $D_{m,n}$ and the image data of pixel $D_{m,n+1}$ above and below the pixel $S_{m,n}$ to be interpolated; the difference $\Delta = |D_{m-1,n} - D_{m+1,n+1}|$ between the image data of pixel $D_{m-1,n}$ and the image data of pixel $D_{m+1,n+1}$ diagonally adjacent the pixel $S_{m,n}$ to be interpolated; and the difference $\Delta_3 = |D_{m-1,n+1} - D_{m+1,n}|$ between the image data of pixel $D_{m+1,n}$ and the image data of pixel $D_{m-1,n+1}$ diagonally adjacent the pixel $S_{m,n}$ to be interpolated.

Next, the smallest of the calculated differences $\Delta_1$, $\Delta_2$ and $\Delta_3$ between these items of image data is detected. The arithmetic mean of the two items of data used to calculate the smallest difference is calculated. The data obtained by the arithmetic mean is the image data of the pixel $S_{m,n}$ to be interpolated. For example, if $\Delta_1$ is the smallest of $\Delta_1 \sim \Delta_3$, the image data of the pixel to be interpolated is $S_{m,n} = (D_{m,n+1} + D_{m,n})/2$. If $\Delta_2$ is the smallest difference, we have $S_{m,n} = (D_{m-1,n} + D_{m+1,n+1})/2$. If $\Delta_3$ is the smallest difference, we have $S_{m,n} = (D_{m-1,n-1} + D_{m+1,n})/2$.

As a result, vertical interpolation is carried out so as to strengthen the correlation vertically and diagonally, and therefore the edge of the still picture obtained is smoothened.

Figure 32:
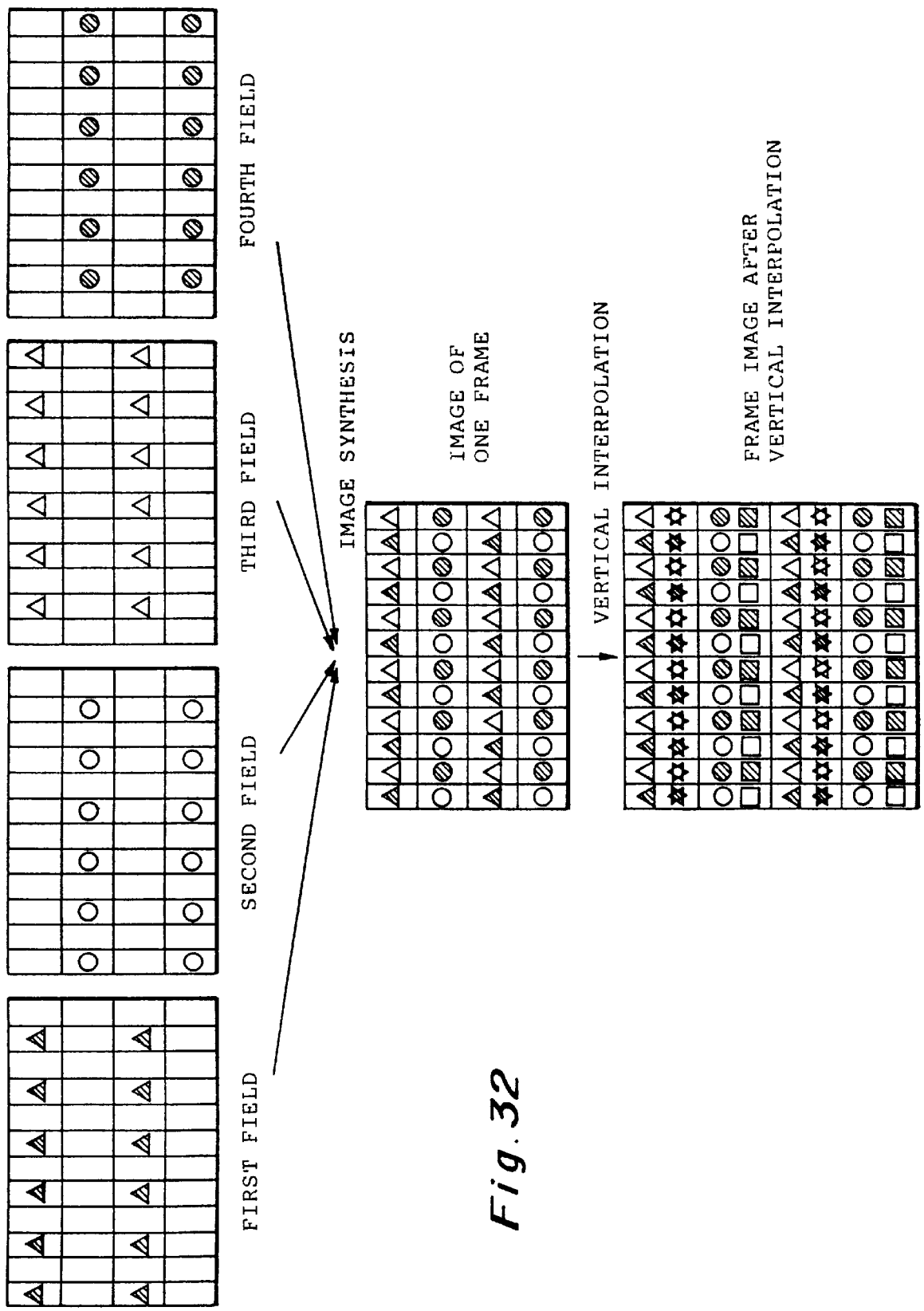
FIG. 32 illustrates a procedure for constructing one frame of an image and a vertically interpolated image from four field images.

Such vertical interpolation processing is performed between all columns so that image data essentially possessing twice as many pixels as 480 pixels in the vertical direction is obtained (see the lowermost part of FIG. 32).

The vertical interpolation circuit 37 included in the digital video tape recorder of FIG. 31 may be incorporated in the digital video tape recorder shown in FIG. 1, and vertical interpolation processing may be executed at the time of still-picture playback.

As many apparently widely different embodiments of the present invention can be made without departing from the spirit and scope thereof, it is to be understood that the invention is not limited to the specific embodiments thereof except as defined in the appended claims.

What is claimed is:

1. A digital image data recording apparatus in which an image is represented by unit image data having a predetermined amount of image data, and a size of a recording area for the unit image data and a recording time necessary for recording the unit image data are each predetermined, said recording apparatus recording the unit image data on a recording medium successively at a period equivalent to the recording time, said recording apparatus comprising:

input means for inputting image data possessing an amount of data that is n times an amount of data in the unit image data, wherein the image data represents a still picture with high resolution and is produced from a first CCD having more pixels than a second CCD for which the recording medium is formatted;

image data partitioning means for partitioning the image data, which has been obtained from said input means, into n units of unit image data in such a manner that each represents the still picture with low resolution; and recording means for recording the n units of unit image data partitioned by said image data partitioning means on the recording medium over n recording areas at a recording time increased by a factor of n.

2. The apparatus of claim 1, wherein said input means is an image sensor for sensing the image of a subject, thereby outputting image data representing the still picture with high resolution and possessing an amount of data that is n times the amount of image data in the unit image data.

3. The apparatus of claim 2, wherein said image sensor includes a single electronic solid-state image sensing device for generating an amount of data that is n times the amount of image data representing the still picture with high resolution, said image sensor outputting image data representing the image of the subject obtained by sensing the image of the subject using said solid-state image electronic image sensing device.

4. The apparatus of claim 2, wherein said image sensor includes three electronic solid-state electronic image sensing elements, said image sensor combining image data representing the still picture with low resolution outputted by said three solid-state electronic image sensing devices, thereby generating and outputting image data possessing an amount of data representing the still picture with high resolution.

5. The apparatus of claim 1, wherein said image data partitioning means includes, a memory for storing image data possessing an amount of data representing the still picture with high resolution obtained from said input means, and means for reading image data representing the still picture with low resolution out of said memory n times, wherein image data corresponding to every n pixels in a row direction or column direction of the image of a subject represented by the image data stored in said memory serves as one unit of unit image data.

6. The apparatus of claim 1, wherein said recording means includes means for compressing the image data representing the still picture with high resolution, the compressed image data being recorded on the recording medium.

7. The apparatus of claim 1, further comprising:

reading means for reading image data from the recording medium; and still-picture generating means for generating image data, which represents the still picture, by combining n units of unit image data read by said reading means and generated by partitioning the still picture with high resolution.

8. The apparatus of claim 1, further comprising:

reading means for reading image data representing the still picture with high resolution from the recording medium;

playback mode setting means for selectively setting a still-picture playback mode and a movie playback mode;

still-picture generating means which, when the still-picture playback mode has been set, is for generating image data, which represents the still picture with high resolution by combining n units of unit image data representing the still picture with low resolution read by said reading means and generated by partitioning the still picture with high resolution; and moving-picture generating means which, when the movie playback mode has been set, is for converting unit image data, which has been read by said reading means, to a signal suitable for display and outputting the signal successively at a period equivalent to the recording time.

9. The apparatus of claim 7, wherein said still-picture generating means includes vertical interpolation means for generating image data representing the still picture with low resolution in the vertical direction by vertically interpolating image data between every two rows of image data representing the combined still picture.

10. The apparatus according to claim 7, wherein said reading means includes means for decompressing the compressed image data read from the recording medium.

11. A digital image data reproducing apparatus for reproducing an image of a still picture from a recording medium, wherein the an image of the still picture is represented by unit image data having a predetermined amount of image data, a size of a recording area for the unit image data and a recording time necessary for recording the unit image data are each predetermined, and image data representing the still picture with high resolution and possessing an amount of data that is n times the amount of data in the unit image data having been partitioned into n units of unit image data in such a manner that each unit of unit image data represents the still picture with low resolution, the n units of unit image data then having been recorded on the recording medium successively at a period equivalent to the recording time, said reproducing apparatus comprising:

reading means for reading image data from the recording medium, wherein the image data is produced from a first CCD having more pixels than a second CCD for which the recording medium is formatted and wherein the image data was recorded in accordance with a standard format; and still-picture generating means for generating image data, which represents the still picture with high resolution, by combining n units of unit image data read by said reading means and representing the still picture with low resolution.

12. A digital image data reproducing apparatus for reproducing an image from a recording medium, wherein the image is represented by unit image data having a predetermined amount of image data, a size of a recording area for the unit image data and a recording time necessary for recording the unit image data are each predetermined, and image data representing a still picture with high resolution and possessing an amount of data that is n times the amount of data in the unit image data having been partitioned into n units of unit image data in such a manner that each unit of unit image data represents the still picture with low resolution, the n units of unit image data then having been recorded on the recording medium successively at a period equivalent to the recording time, said reproducing apparatus comprising:

reading means for reading image data from the recording medium, wherein the image data is produced from a first CCD having more pixels than a second CCD for which the recording medium is formatted and wherein the image data was recorded in accordance with a standard format;

playback mode setting means for selectively setting a still-picture playback mode and a movie playback mode;

still-picture generating means which, when the still-picture playback mode has been set, is for generating image data, which represents the still picture with high resolution, by combining n units of unit image data read by said reading means and representing the still picture with low resolution; and moving-picture generating means which, when the movie playback mode has been set, is for converting unit image data, which has been read by said reading means, to a signal suitable for display and outputting the signal successively at a period equivalent to the recording time.

13. The apparatus of claim 11, wherein said still-picture generating means includes vertical interpolation means for generating image data representing the still picture with low resolution in the vertical direction by vertically interpolating image data between every two rows of image data representing the combined still picture.

14. The apparatus of claim 11, wherein said reading means includes means for decompressing the compressed image data read from the recording medium.

15. In a digital image data recording apparatus in which an image is represented by unit image data, representing a still picture with high resolution, having a predetermined amount of image data, and a size of a recording area for the unit image data and a recording time necessary for recording the unit image data are each predetermined, said recording apparatus recording the unit image data on a recording medium successively at a period equivalent to the recording time, a method of recording digital image data comprising the steps of:

obtaining image data possessing an amount of data that is n times the amount of data in the unit image data, wherein the image data is produced from a first CCD having more pixels than a second CCD for which the recording medium is formatted;

partitioning the obtained image data into n units of unit image data, representing the still picture with low resolution, in such a manner that each represents one frame of an image so that the image data can be recorded in accordance with a standard format; and recording the n units of unit image data obtained by partitioning on the recording medium over n recording areas at a recording time increased by a factor of n.

16. The method of claim 15, further comprising a step of sensing the image of a subject, thereby obtaining image data representing the still picture with high resolution and possessing an amount of data that is n times the amount of image data in the unit image data.

17. The method of claim 16, wherein image data representing the still picture with high resolution is obtained by sensing the image of the subject using a single electronic solid-state image sensing device for generating an amount of data that is n times the amount of image data in the unit image data representing the still picture with low resolution.

18. The method of claim 16, wherein the image of a subject is sensed using three electronic solid-state electronic image sensing elements and the image data outputted by the three solid-state electronic image sensing elements is combined, thereby generating an amount of data representing the still picture with high resolution that is n times the amount of image data in the unit image data representing the still picture with low resolution.

19. The method of claim 16, wherein partitioning of image data is performed by temporarily storing, in memory, image data possessing an amount of data representing the still picture with high resolution which is n times the amount of image data in the unit image data obtained, and reading image data out of the memory n times, wherein image data corresponding to every n pixels in a row direction or column direction of the image of a subject represented by the image data stored in the memory representing the still picture with low resolution.

20. The method of claim 16, wherein the image data representing the still picture with low resolution obtained by the partitioning is compressed and the compressed image data is recorded on the recording medium.

21. A digital image data reproducing method for reproducing an image from a recording medium, wherein the image is represented by unit image data, representing a still picture with a high resolution, having a predetermined amount of image data, a size of a recording area for the unit image data and a recording time necessary for recording the unit image data are each predetermined, and image data representing the still picture with high resolution and possessing an amount of data that is n times the amount of data in the unit image data having been partitioned into n units of unit image data in such a manner that each unit of unit image data represents the still picture with low resolution, the n units of unit image data then having been recorded on the recording medium successively at a period equivalent to the recording time, said method comprising the steps of:

reading image data from the recording medium, wherein the image data is produced from a first CCD having more pixels than a second CCD for which the recording medium is formatted and wherein the image data was recorded in accordance with a standard format; and generating image data representing the still picture with high resolution by combining n units of unit image data that have been read and representing the still picture with low resolution.

22. A digital image data reproducing method for reproducing an image of a still picture from a recording medium, wherein the image of the still picture is represented by unit image data, representing the still picture with high resolution, having a predetermined amount of image data, a size of a recording area for the unit image data and a recording time necessary for recording the unit image data are each predetermined, and image data representing the still picture with high resolution and possessing an amount of data that is n times the amount of data in the unit image data having been partitioned into n units of unit image data in such a manner that each unit of unit image data represents the still picture with low resolution, the n units of unit image data then having been recorded on the recording medium successively at a period equivalent to the recording time, said method comprising the steps of:

reading image data from the recording medium, wherein the image data is produced from a first CCD having more pixels than a second CCD for which the recording medium is formatted and wherein the image data was recorded in accordance with a standard format;

selectively setting one of a still-picture playback mode and a movie playback mode;

when the still-picture playback mode has been set, generating image data representing the still picture with high resolution by combining n units of read unit image data representing the still picture with low resolution; and when the movie playback mode has been set, converting the read unit image data to a signal suitable for display and outputting the signal successively at a period equivalent to the recording time.

23. The method of claim 21, wherein image data representing the still picture with low resolution in the vertical direction is generated by vertically interpolating image data between every two rows of image data representing the combined still picture.

24. The method of claim 21, wherein when image data representing the still picture with high resolution has been recorded on the recording medium upon being compressed, the compressed image data read from the recording medium is decompressed.

25. A digital image data recording apparatus for recording image data on a recording medium, the recording medium having a plurality of frames of a predetermined size, said digital image data recording apparatus comprising:

receiving means for receiving the image data, which represents a still picture with high resolution, the image data including an amount of data that is n times the predetermined size of each of the plurality of frames representing the still picture with low resolution, wherein the image data is produced from a first CCD having more pixels than a second CCD for which the recording medium is formatted;

image data partitioning means for partitioning the image data, received by said receiving means, into n units of unit image data in such a manner that each of the n units of image data can be stored in one of the plurality of frames so that the image data can be recorded in accordance with a standard format; and recording means for recording the n units of unit image data partitioned by said image data partitioning means on the recording medium over n frames.

26. The digital image data recording apparatus of claim 25, wherein each of the n units of image data individually may be reproduced to obtain an ordinary quality reproduction of the image and all of the n units of image data together may be reproduced to obtain a higher quality reproduction of the image.

27. A digital image data recording apparatus for recording image data on a recording medium, the recording medium having a plurality of frames of a predetermined size, said digital image data recording apparatus comprising:

reading means for reading the image data, which represents a still picture with high resolution, from the recording medium, wherein the image data was recorded on the recording medium by partitioning the image data into n units of image data representing the still picture with low resolution and each of the n units of image data was stored in a frame on the recording medium, wherein the image data is produced from a first CCD having more pixels than a second CCD for which the recording medium is formatted and wherein the image data was recorded in accordance with a standard format; and still-picture generating means for generating the image, which represents one frame of a still picture, by combining the n units of unit image data read by said reading means.

28. The digital image data recording apparatus of claim 27, wherein each of the n units of image data individually may be reproduced to obtain a lower quality still picture of the image.

29. A digital image data recording apparatus for recording image data on a recording medium, the recording medium having a plurality of frames of a predetermined size, said digital image data recording apparatus comprising:

reading means for reading the image data, which represents a still picture with high resolution, from the recording medium, wherein the image data was recorded on the recording medium by partitioning the image data into n units of image data representing the still picture with low resolution and each of the n units of image data was stored in a frame on the recording medium, wherein the image data is produced from a first CCD having more pixels than a second CCD for which the recording medium is formatted and wherein the image data was recorded in accordance with a standard format; and playback mode setting means for selectively setting a still-picture playback mode and a movie playback mode;

still-picture generating means for, when the still-picture playback mode has been set, generating the image, which represents the still picture with high resolution, by combining the n units of unit image data representing the still picture with low resolution read by said reading means; and moving-picture generating means for, when the movie playback mode has been set, generating a moving image by reproducing one of the n units of unit image data read by said reading means.

30. The digital image data recording apparatus of claim 29, wherein, in the still-picture playback mode, each of the n units of image data individually may be reproduced to obtain a lower quality still picture of the image.

31. A method of recording image data on a recording medium, the recording medium having a plurality of frames of a predetermined size, said method comprising the steps of:

receiving the image data, which represents a still picture with high resolution, the image data including an amount of data that is n times the predetermined size of each of the plurality of frames, representing the still picture with low resolution wherein the image data is produced from a first CCD having more pixels than a second CCD for which the recording medium is formatted;

partitioning the image data into n units of unit image data representing the still picture with low resolution in such a manner that each of the n units of image data can be stored in one of the plurality of frames so that the image data can be recorded in accordance with a standard format; and recording the n units of unit image data representing the still picture with low resolution on the recording medium over n frames.

32. The method of claim 31, wherein each of the n units of image data individually may be reproduced to obtain an ordinary quality reproduction of the image and all of the n units of image data together may be reproduced to obtain a higher quality reproduction of the image.

33. A method of reproducing recorded image data from a recording medium, the recording medium having a plurality of frames of a predetermined size, said method comprising the steps of:

reading the image data, which represents a still picture with high resolution, from the recording medium, wherein the image data was recorded on the recording medium by partitioning the image data into n units of image data representing the still picture with low resolution and each of the n units of image data was stored in a frame on the recording medium, wherein the image data is produced from a first CCD having more pixels than a second CCD for which the recording medium is formatted and wherein the image data was recorded in accordance with a standard format; and generating the image, which represents the still picture with high resolution, by combining the n units of unit image data representing the still picture with low resolution.

34. The method of claim 33, wherein each of the n units of image data individually may be reproduced to obtain an ordinary quality reproduction of the image and all of the n units of image data together may be reproduced to obtain a higher quality reproduction of the image.

35. A method of reproducing recorded image data from a recording medium, the recording medium having a plurality of frames of a predetermined size, said method comprising the steps of:

reading the image data, which represents a still picture with high resolution, from the recording medium, wherein the image data was recorded on the recording medium by partitioning the image data into n units of image data representing the still picture with low resolution and each of the n units of image data was stored in a frame on the recording medium, wherein the image data is produced from a first CCD having more pixels than a second CCD for which the recording medium is formatted and wherein the image data was recorded in accordance with a standard format; and selectively setting a still-picture playback mode and a movie playback mode;

generating the image, which represents the still picture with high resolution, by combining the n units of unit image data representing the still picture with low resolution, when the still-picture playback mode has been set; and generating a moving image by reproducing one of the n units of unit image data, when the movie playback mode has been set.

36. The method of claim 35, wherein each of the n units of image data individually may be reproduced to obtain an ordinary quality reproduction of the image and all of the n units of image data together may be reproduced to obtain a higher quality reproduction of the image.

* * * * *